(12) United States Patent
Abdelghaffar et al.

(10) Patent No.: US 12,199,908 B2
(45) Date of Patent: Jan. 14, 2025

(54) APERIODIC (AP) CHANNEL STATE INFORMATION (CSI) QUASI-COLOCATION (QCL) ASSUMPTION WITH SINGLE FREQUENCY NETWORK (SFN) PHYSICAL DOWNLINK CONTROL CHANNEL (PDCCH) TRANSMISSION

(71) Applicant: QUALCOMM Incorporated, San Diego, CA (US)

(72) Inventors: Muhammad Sayed Khairy Abdelghaffar, San Jose, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 468 days.

(21) Appl. No.: 17/657,714

(22) Filed: Apr. 1, 2022

(65) Prior Publication Data

US 2022/0368495 A1   Nov. 17, 2022

Related U.S. Application Data

(60) Provisional application No. 63/186,878, filed on May 11, 2021.

(51) Int. Cl.
*H04L 5/00* (2006.01)
*H04B 7/024* (2017.01)

(52) U.S. Cl.
CPC ........... *H04L 5/0051* (2013.01); *H04B 7/024* (2013.01)

(58) Field of Classification Search
CPC .............................. H04L 5/0051; H04B 7/024
See application file for complete search history.

(56) References Cited

U.S. PATENT DOCUMENTS

| | | | |
|---|---|---|---|
| 2021/0226688 A1* | 7/2021 | Khoshnevisan | H04L 5/0092 |
| 2021/0320699 A1* | 10/2021 | Zhou | H04L 5/0048 |
| 2021/0321372 A1* | 10/2021 | Zhou | H04W 72/1268 |
| 2022/0132517 A1* | 4/2022 | Zhu | H04L 5/0051 |
| 2022/0210818 A1* | 6/2022 | Cirik | H04W 72/12 |
| 2022/0225362 A1* | 7/2022 | Yi | H04W 72/046 |
| 2022/0330301 A1* | 10/2022 | Huang | H04W 72/1273 |
| 2022/0361202 A1* | 11/2022 | Yi | H04W 24/10 |
| 2022/0408475 A1* | 12/2022 | Cirik | H04L 5/001 |
| 2023/0076897 A1* | 3/2023 | Svedman | H04W 72/23 |
| 2023/0156738 A1* | 5/2023 | Gao | H04L 5/0053 370/330 |

(Continued)

*Primary Examiner* — Ajay Cattungal
(74) *Attorney, Agent, or Firm* — Patterson+ Sheridan, L.L.P.

(57) ABSTRACT

Certain aspects of the present disclosure provide a method for wireless communication by a user equipment (UE). The UE receives signaling configuring the UE with a control resource set (CORESET) activated with two transmission configuration indicator (TCI) states. The UE further receives a downlink control information (DCI) triggering transmission of aperiodic channel state information (CSI) reference signals (RSs) on aperiodic CSI-RS resources. The UE applies a quasi-colocation (QCL) assumption of at least one of the two TCI states for processing the aperiodic CSI-RSs, when a scheduling time offset is less than a threshold value and depending on whether same or different aperiodic CSI-RS resources are received from two transmission reception points (TRPs) associated.

30 Claims, 22 Drawing Sheets

(56) References Cited

U.S. PATENT DOCUMENTS

| | | | |
|---|---|---|---|
| 2023/0179354 A1* | 6/2023 | Muruganathan | ...... H04L 5/0023 370/329 |
| 2023/0299916 A1* | 9/2023 | Muruganathan | ...... H04L 5/0094 370/329 |
| 2024/0015740 A1* | 1/2024 | Xiao | ................. H04W 72/1273 |

* cited by examiner

| QCL Variant | TCI State #1 | TCI State #2 |
|---|---|---|
| Variant E | QCL-Type A<br>{Average Delay, Delay Spread,<br>Doppler Shift, Doppler Spread} | QCL-Type A<br>Average Delay, Delay Spread<br>Doppler shift, Doppler spread |

FIG. 7

APERIODIC (AP) CHANNEL STATE INFORMATION (CSI) QUASI-COLOCATION (QCL) ASSUMPTION WITH SINGLE FREQUENCY NETWORK (SFN) PHYSICAL DOWNLINK CONTROL CHANNEL (PDCCH) TRANSMISSION

CROSS-REFERENCE TO RELATED APPLICATION

This application claims benefit of and priority to U.S. Provisional Patent Application No. 63/186,878, filed May 11, 2021, which is hereby incorporated by reference in its entirety.

BACKGROUND

Field of the Disclosure

Aspects of the present disclosure relate to wireless communications, and more particularly, to techniques for quasi-colocation (QCL) assumption for aperiodic channel state information (CSI) reference signals (RSs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a BS, 5G NB, next generation NodeB (gNB or gNodeB), TRP, etc.). A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable techniques for determining quasi-colocation (QCL) assumptions for aperiodic channel state information (CSI) reference signals (RSs) with a single frequency network (SFN) physical downlink control channel (PDCCH) transmission.

Certain aspects provide a method of wireless communications by a user equipment (UE). The method generally includes receiving signaling configuring the UE with at least one control resource set (CORESET) activated with at least two transmission configuration indicator (TCI) states; receiving a downlink control information (DCI) triggering transmission of aperiodic CSI-RSs on aperiodic CSI-RS resources; and applying a QCL assumption of at least one of the at least two TCI states for processing the aperiodic CSI-RSs, when a scheduling time offset is less than a threshold value and depending on whether same or different aperiodic CSI-RS resources are received from two transmission reception points (TRPs).

Certain aspects provide an apparatus for wireless communications by a UE. The apparatus generally includes a memory comprising instructions, and one or more processors configured to execute the instructions and cause the apparatus to: receive signaling configuring the UE with at least one CORESET activated with at least two TCI states; receive a DCI triggering transmission of aperiodic CSI-RSs on aperiodic CSI-RS resources; and apply a QCL assumption of at least one of the at least two TCI states for processing the aperiodic CSI-RSs, when a scheduling time offset is less than a threshold value and depending on whether same or different aperiodic CSI-RS resources are received from two TRPs.

Certain aspects provide an apparatus for wireless communications. The apparatus generally includes means for receiving signaling configuring the UE with at least one CORESET activated with at least two TCI states; means for receiving a DCI triggering transmission of aperiodic CSI-RSs on aperiodic CSI-RS resources; and means for applying a QCL assumption of at least one of the at least two TCI states for processing the aperiodic CSI-RSs, when a scheduling time offset is less than a threshold value and depending on whether same or different aperiodic CSI-RS resources are received from two TRPs.

Certain aspects of the subject matter described in this disclosure can be implemented in a computer readable medium storing computer executable code thereon for wireless communications. The computer readable medium comprises code for receiving signaling configuring the UE with at least one CORESET activated with at least two TCI states; code for receiving a DCI triggering transmission of aperiodic CSI-RSs on aperiodic CSI-RS resources; and code for applying a QCL assumption of at least one of the at least two TCI states for processing the aperiodic CSI-RSs, when a scheduling time offset is less than a threshold value and depending on whether same or different aperiodic CSI-RS resources are received from two TRPs.

Certain aspects provide a method of wireless communications by a UE. The method generally includes receiving signaling configuring the UE with at least two TCI states indicating a SFN PDSCH; receiving a DCI triggering transmission of aperiodic CSI-RSs on aperiodic CSI-RS resources; and applying a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs.

Certain aspects provide an apparatus for wireless communications by a UE. The apparatus generally includes a memory comprising instructions, and one or more processors configured to execute the instructions and cause the apparatus to: receive signaling configuring the UE with at least two TCI states indicating a SFN PDSCH; receive a DCI triggering transmission of aperiodic CSI-RSs on aperiodic CSI-RS resources; and apply a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs.

Certain aspects provide an apparatus for wireless communications. The apparatus generally includes means for receiving signaling configuring the UE with at least two TCI states indicating a SFN PDSCH; means for receiving a DCI triggering transmission of aperiodic CSI-RSs on aperiodic CSI-RS resources; and means for applying a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs.

Certain aspects of the subject matter described in this disclosure can be implemented in a computer readable medium storing computer executable code thereon for wireless communications. The computer readable medium comprises code for receiving signaling configuring the UE with at least two TCI states indicating a SFN PDSCH; code for receiving a DCI triggering transmission of aperiodic CSI-RSs on aperiodic CSI-RS resources; and code for applying a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs.

Certain aspects provide a method of wireless communications by a UE. The method generally includes receiving signaling configuring the UE with at least two TCI states; receiving a DCI triggering transmission of aperiodic CSI-RSs on aperiodic CSI-RS resources; and applying a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs.

Certain aspects provide an apparatus for wireless communications by a UE. The apparatus generally includes a memory comprising instructions, and one or more processors configured to execute the instructions and cause the apparatus to: receive signaling configuring the UE with at least two TCI states; receive a DCI triggering transmission of aperiodic CSI-RSs on aperiodic CSI-RS resources; and apply a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs.

Certain aspects provide an apparatus for wireless communications. The apparatus generally includes means for receiving signaling configuring the UE with at least two TCI states; means for receiving a DCI triggering transmission of aperiodic CSI-RSs on aperiodic CSI-RS resources; and means for applying a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs.

Certain aspects of the subject matter described in this disclosure can be implemented in a computer readable medium storing computer executable code thereon for wireless communications. The computer readable medium comprises code for receiving signaling configuring the UE with at least two TCI states; code for receiving a DCI triggering transmission of aperiodic CSI-RSs on aperiodic CSI-RS resources; and code for applying a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs.

Certain aspects provide a method of wireless communications by a network entity. The method generally includes configuring a UE with at least one CORESET activated with at least two TCI states; and sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value and depending on whether same or different aperiodic CSI-RS resources are received from two TRPs associated with the network entity.

Certain aspects provide an apparatus for wireless communications by a network entity. The apparatus generally includes a memory comprising instructions, and one or more processors configured to execute the instructions and cause the apparatus to: configure a UE with at least one CORESET activated with at least two TCI states; and send, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value and depending on whether same or different aperiodic CSI-RS resources are received from two TRPs associated with the network entity.

Certain aspects provide an apparatus for wireless communications. The apparatus generally includes means for configuring a UE with at least one CORESET activated with at least two TCI states; and means for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value and depending on whether same or different aperiodic CSI-RS resources are received from two TRPs associated with the network entity.

Certain aspects of the subject matter described in this disclosure can be implemented in a computer readable medium storing computer executable code thereon for wireless communications. The computer readable medium comprises code for configuring a UE with at least one CORESET activated with at least two TCI states; and code for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value and depending on whether same or different aperiodic CSI-RS resources are received from two TRPs associated with the network entity.

Certain aspects provide a method of wireless communications by a network entity. The method generally includes configuring a UE with at least two TCI states indicating a SFN PDSCH; and sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs associated with the network entity.

Certain aspects provide an apparatus for wireless communications by a network entity. The apparatus generally includes a memory comprising instructions, and one or more processors configured to execute the instructions and cause the apparatus to: configure a UE with at least two TCI states indicating a SFN PDSCH; and send, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs associated with the network entity.

Certain aspects provide an apparatus for wireless communications. The apparatus generally includes means for configuring a UE with at least two TCI states indicating a SFN PDSCH; and means for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs associated with the network entity.

Certain aspects of the subject matter described in this disclosure can be implemented in a computer readable medium storing computer executable code thereon for wireless communications. The computer readable medium comprises code for configuring a UE with at least two TCI states indicating a SFN PDSCH; and code for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs associated with the network entity.

Certain aspects provide a method of wireless communications by a network entity. The method generally includes configuring a UE with at least two TCI states; and sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs associated with the network entity.

Certain aspects provide an apparatus for wireless communications by a network entity. The apparatus generally includes a memory comprising instructions, and one or more processors configured to execute the instructions and cause the apparatus to: configure a UE with at least two TCI states; and send, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs associated with the network entity.

Certain aspects provide an apparatus for wireless communications. The apparatus generally includes means for configuring a UE with at least two TCI states; and means for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs associated with the network entity.

Certain aspects of the subject matter described in this disclosure can be implemented in a computer readable medium storing computer executable code thereon for wireless communications. The computer readable medium comprises code for configuring a UE with at least two TCI states; and code for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs associated with the network entity.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates example quasi-colocation (QCL) variant for different transmission configuration indicator (TCI) states, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
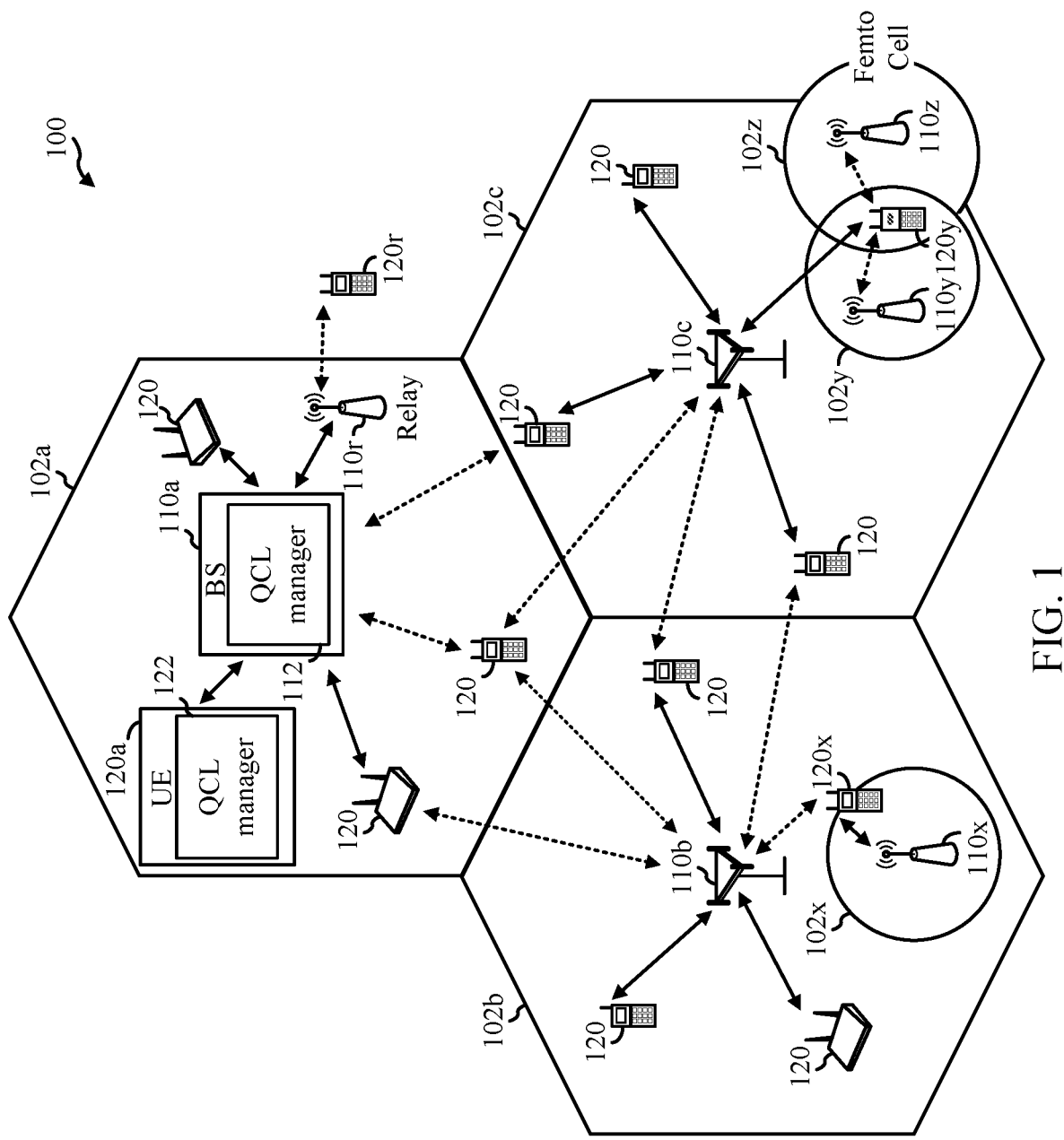
FIG. 1 is a block diagram conceptually illustrating an example wireless communication network, in accordance with certain aspects of the present disclosure.
Figure 1:
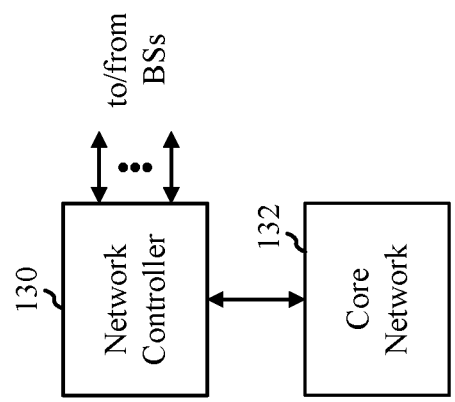

Aspects of the present disclosure provide apparatuses, methods, processing systems, and computer readable mediums for determining and applying quasi-colocation (QCL) assumption for receiving and processing aperiodic channel state information (CSI) reference signals (RSs) with a single frequency network (SFN) physical downlink control channel (PDCCH) transmission.

The following description provides examples of QCL assumption for aperiodic CSI-RSs in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3$^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include network entities (e.g., base stations (BSs) 110) and/or user equipments (UEs) 120 for determining and applying quasi-colocation (QCL) assumption for receiving and processing aperiodic channel state information (CSI) reference signals (RSs). As shown in FIG. 1, a UE 120a includes a QCL manager 122 and a BS 110a includes a QCL manager 112. The QCL manager 122 may be configured to perform operations 1000 of FIG. 10, operations 1200 of FIG. 12, and/or operations 1400 of FIG. 14. The QCL manager 112 may be configured to perform operations 1100 of FIG. 11, operations 1300 of FIG. 13, and/or operations 1500 of FIG. 15.

The wireless communication network 100 may be a new radio (NR) system (e.g., a 5th generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 22:
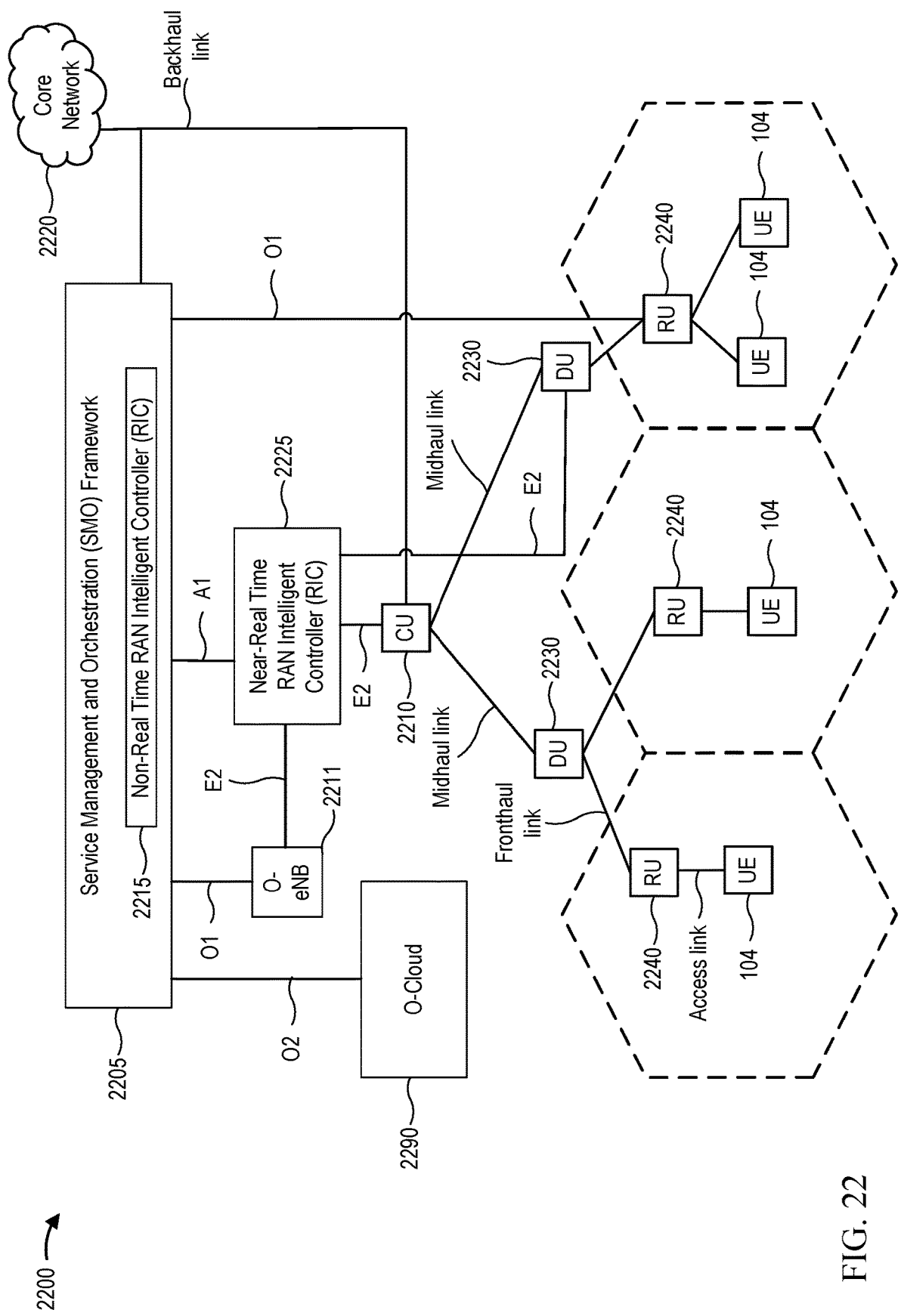
FIG. 22 depicts an example disaggregated BS architecture.

In various aspects, a BS 110 or a network node can be implemented as an aggregated BS, a disaggregated BS, an integrated access and backhaul (IAB) node, a relay node, or a sidelink node, to name a few examples. FIG. 22, discussed in further detail later in this disclosure, depicts an example disaggregated BS architecture.

Figure 2:
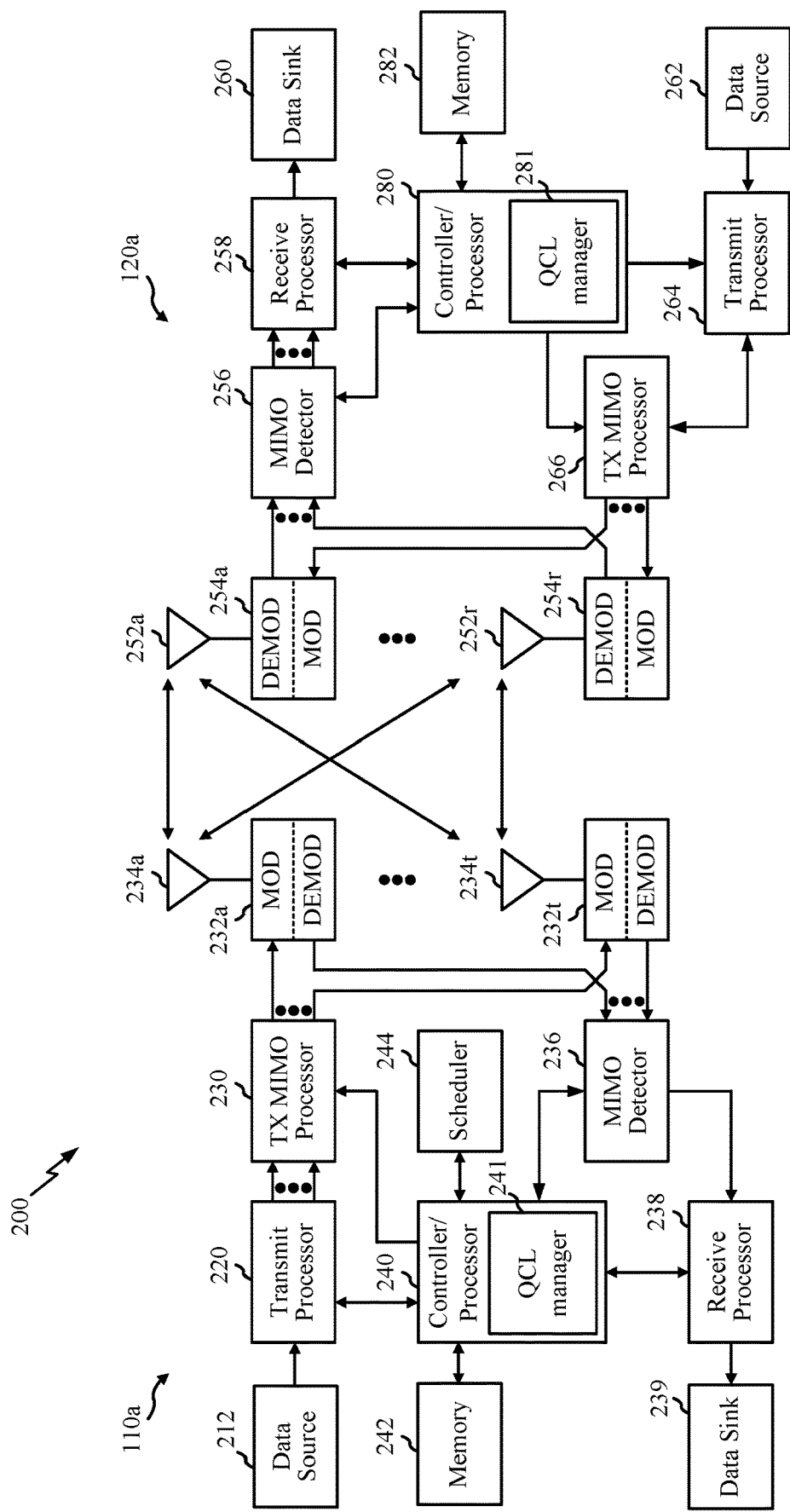
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a QCL manager 241 that may be configured to perform the operations illustrated in FIG. 11, FIG. 13, and/or FIG. 15, as well as other operations disclosed herein. As shown in FIG. 2, the controller/processor 280 of the UE 120a has a QCL manager 281 that may be configured to perform the operations illustrated in FIG. 10, FIG. 12, and/or FIG. 14, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
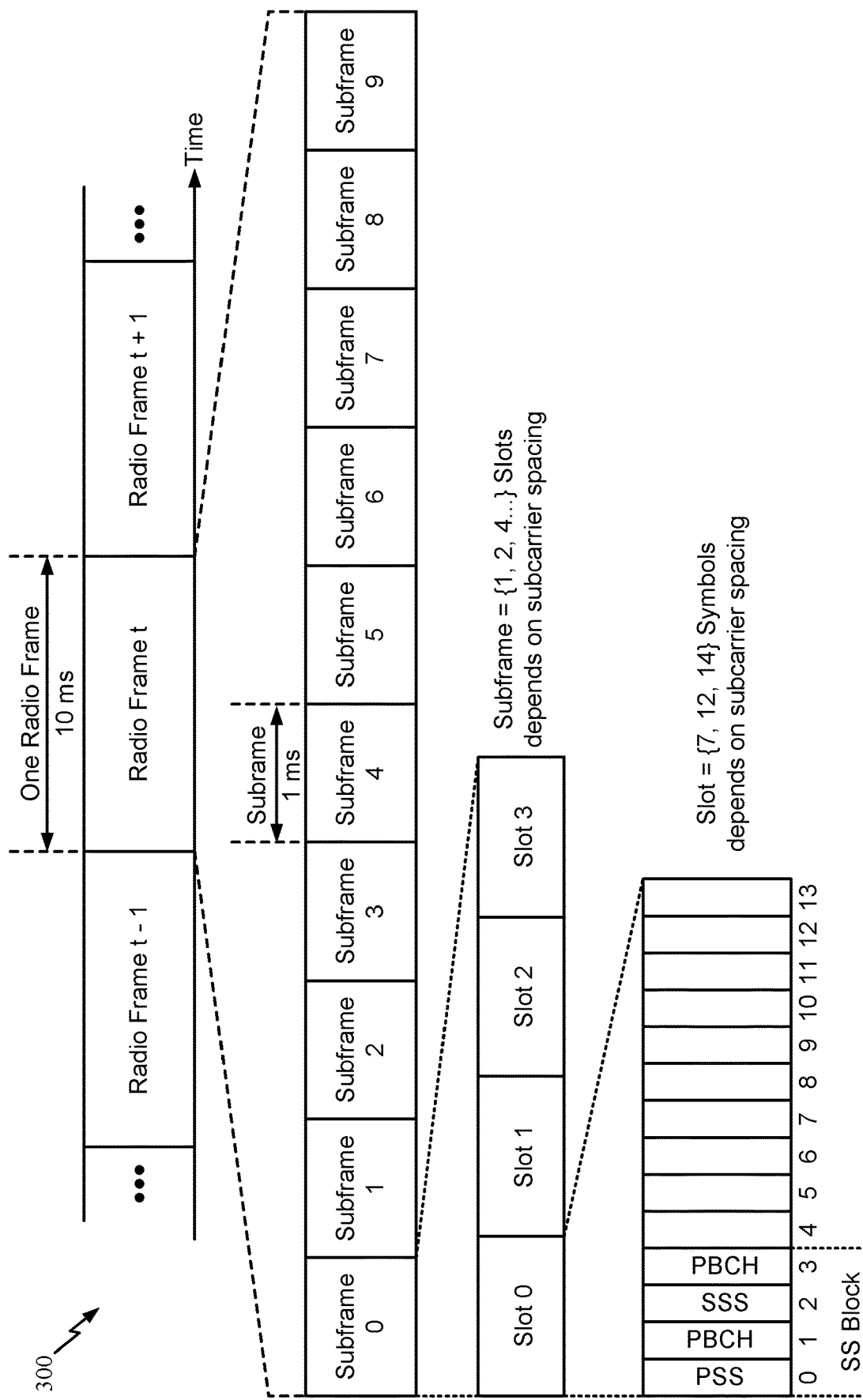
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, ... slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example CSI Reporting Configuration

Channel state information (CSI) may refer to channel properties of a communication link. The CSI represents combined effects of, for example, scattering, fading, and power decay with a distance between a transmitter and a receiver. Channel estimation using pilots, such as CSI reference signals (CSI-RS), is performed to determine these effects on a channel. The CSI is used to adapt transmissions based on current channel conditions, which is useful for achieving reliable communication, in particular, with high data rates in multi-antenna systems. The CSI is estimated at the receiver, quantized, and fed back to the transmitter.

In some cases, a base station (BS) configures a user equipment (UE) for CSI reporting. For example, the BS configures the UE with a CSI reporting configuration or with multiple CSI report configurations for the CSI reporting. The BS provides the CSI reporting configuration to the UE via a higher layer signaling, such as a radio resource control (RRC) signaling (e.g., via a "CSI-ReportConfig" information element (IE)).

Each CSI report configuration is associated with a single downlink (DL) bandwidth part (BWP). The CSI report setting configuration defines a CSI reporting band as a subset of subbands of the BWP. The DL BWP is indicated by a higher layer parameter (e.g., "bwp-Id") in the CSI report configuration for channel measurement (CM) and contains parameter(s) for one CSI reporting band, such as a codebook configuration, time-domain behavior, frequency granularity for the CSI, measurement restriction configurations, and/or the CSI-related quantities to be reported by the UE. Each CSI resource setting is located in the DL BWP identified by the higher layer parameter, and all CSI resource settings are linked to a CSI report setting that have the same DL BWP.

The CSI report configuration configures time and frequency resources used by the UE to report the CSI. For example, the CSI report configuration is associated with CSI-RS resources for the CM, interference measurement (IM), or both. The CSI report configuration configures the CSI-RS resources for measurement (e.g., via a "CSI-ResourceConfig" IE). The CSI-RS resources provide the UE with the configuration of CSI-RS ports, or CSI-RS port groups, mapped to time and frequency resources (e.g., resource elements (REs)). The CSI-RS resources can be zero power (ZP) or non-zero power (NZP) resources. At least one NZP CSI-RS resource is configured for the CM. For the IM, it can be NZP CSI-RS or zero power CSI-RS, which is known as CSI-IM (note, if NZP CSI-RS, it is called NZP CSI-RS for IM, if zero power, it is called CSI-IM).

The CSI report configuration configures the UE for aperiodic, periodic, or semi-persistent CSI reporting. For periodic CSI, the UE is configured with periodic CSI-RS resources. Periodic CSI and semi-persistent CSI report on a physical uplink control channel (PUCCH) is triggered via a RRC or a medium access control (MAC)-control element (CE).

For aperiodic and semi-persistent CSI on a physical uplink shared channel (PUSCH), the BS signals the UE a CSI report trigger indicating the UE to send a CSI report for one or more CSI-RS resources, or configuring the CSI-RS report trigger state (e.g., "CSI-AperiodicTriggerStateList" and "CSI-SemiPersistentOnPUSCH-TriggerStateList"). The BS provides the CSI report trigger to the UE for the aperiodic CSI and the semi-persistent CSI on the PUSCH, via a downlink control information (DCI) from the BS to the UE. The CSI-RS trigger is signaling indicating the UE that the CSI-RS will be transmitted for the CSI-RS resource.

The UE reports a CSI feedback to the BS, based on the CSI report configuration and the CSI report trigger. For example, the UE may measure the channel associated with the CSI for the triggered CSI-RS resources. Based on the measurements, the UE may select a preferred CSI-RS resource. The UE reports the CSI feedback to the BS for the selected CSI-RS resource.

Example TCI States

In wireless communication systems, transmissions are via multiple transmission configuration indicator (TCI) states. In some cases, a TCI state is associated with a beam pair, an antenna panel, one or more antenna ports, one or more antenna port groups, a quasi-colocation (QCL) relation, and/or a transmission reception point (TRP). Multi-TCI state transmission is associated with multiple beam pairs, multiple antenna panels, and/or multiple QCL relations, which are associated with multiple TRPs (e.g., multi-TRP). The TCI state indicates a QCL assumption that a user equipment (UE) uses for channel estimation.

In some cases, the TCI state indicates to the UE an association between a downlink (DL) reference signal to a corresponding QCL type that allows the UE to determine a receive beam to use for receiving a transmission. The QCL-type is associated with a combination (e.g., a set) of QCL parameters. In some cases, a QCL-TypeA indicates ports are QCL'd with respect to Doppler shift, Doppler spread, average delay, and/or delay spread. In some cases, a QCL-TypeB indicates ports are QCL'd with respect to Doppler shift and/or Doppler spread. In some cases, a QCL-TypeC indicates ports are QCL'd with respect to average delay and/or Doppler shift. In some cases, a QCL-TypeD indicates ports are QCL'd with respect to Spatial Rx parameter. Different groups of ports can share different sets of QCL parameters.

In some cases, for a multi-TCI state scenario, a same transport block (TB)/code block (CB) (e.g., same information bits but can be different coded bits) is transmitted from multiple TCI states, such as two or more TRPs in a multi-TRP scenario. The UE considers transmissions from both the TCI states and jointly decodes the transmissions. In some cases, the transmissions from the TCI states is at a same time (e.g., in a same slot, a mini-slot, and/or in same symbols), but across different resource blocks (RBs) and/or different layers. The number of layers from each TCI state can be same or different. In some cases, for the same codeword (i.e., the same TB/CB) multi-TRP transmission, a modulation order is same. For multi-TRP transmission involving different codewords (e.g., two codewords from the two TRPs), each codeword is associated with a rank, a modulation, and/or a resource allocation (e.g., referred to as a multi-DCI based multi-TRP transmission). In some cases, the transmissions from the TCI states can be at different times (e.g., in two consecutive mini-slots or slots). In some cases, the transmissions from the TRPs can be a combination of the above.

Example Multi-TRP Scenarios

Figure 4:
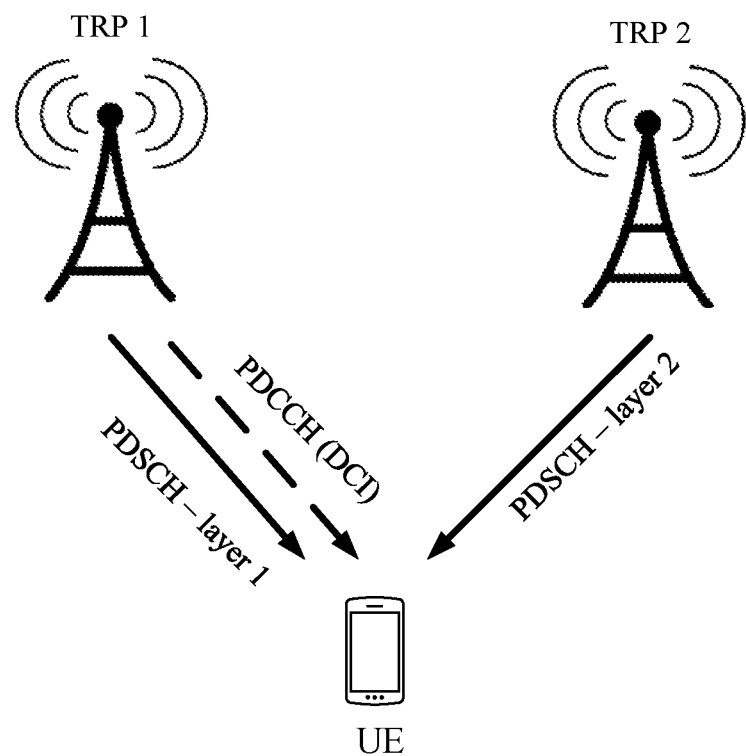
FIG. 4 illustrates example single downlink control information (single-DCI) multi transmission reception point (multi-TRP) scenario, in accordance with certain aspects of the present disclosure.
Figure 5:
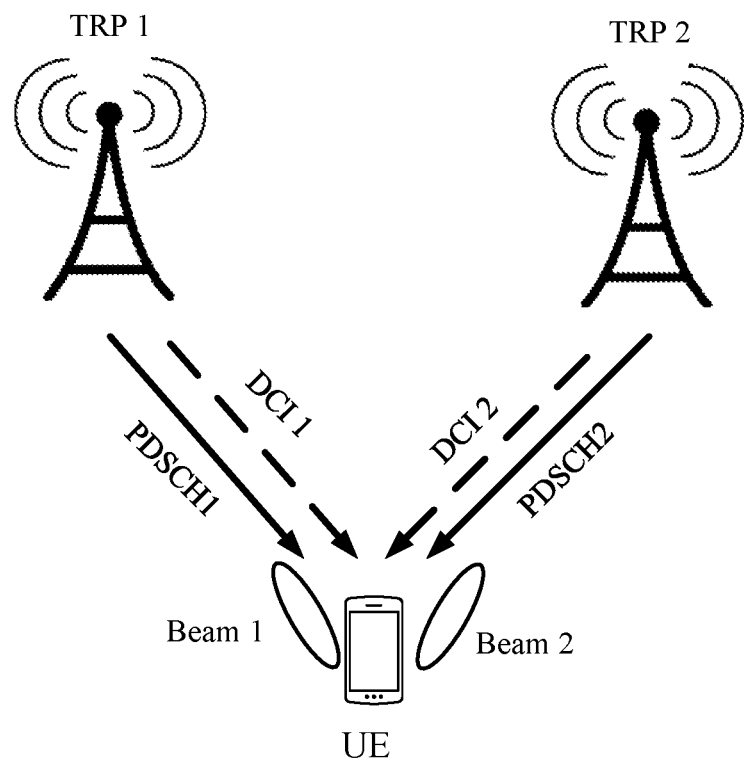
FIG. 5 illustrates example multi-DCI multi-TRP scenario, in accordance with certain aspects of the present disclosure.

In certain wireless communication systems (e.g., Release 16 system), a multi transmission reception point (multi- TRP) operation was introduced to increase system capacity as well as reliability. In some cases, as illustrated in FIG. 4, multi-TRP transmissions are configured based on a single downlink control information (single-DCI). In some cases, as illustrated in FIG. 5, multi-TRP transmissions are configured based on multiple DCIs (multi-DCI).

Referring back to FIG. 4, a single DCI (transmitted via a physical downlink control channel (PDCCH) from a first TRP (e.g., TRP 1) schedules a physical downlink shared channel (PDSCH) (e.g., PDSCH layer 1) from the first TRP and a PDSCH (e.g., PDSCH layer 2) from a second TRP (e.g., TRP 2).

In some cases, the multi-TRP operation configured based on the single DCI communication is suited for deployments with an ideal backhaul or a backhaul with a small delay, and involves various transmission schemes. The transmissions schemes include a spatial division multiplexing (SDM) scheme, a frequency division multiplexing (FDM) scheme, and/or a time division multiplexing (TDM) scheme.

In some cases, per the SDM scheme (also known as a non-coherent joint transmission (NCJT)), a first set of layers are transmitted from the first TRP and a second set of layers are transmitted from the second TRP. These transmissions utilize a same frequency domain resource allocation (FDRA) and a time division resource allocation (TDRA).

In some cases, per the FDM scheme, transmissions from the first TRP and the second TRP have a same rank and a same code word (CW), but with different FDRAs across the first TRP and the second TRP.

In some cases, per the TDM scheme, transmissions from the first TRP and the second TRP have a same rank and a same CW, but with different TDRAs across the first TRP and the second TRP.

In some cases, the PDSCH to a user equipment (UE) is sent in multiple parts. For example, the first TRP sends a first part of the PDSCH (e.g., on the first set of layers with a first set of FDRA and a first set of TDRA) to the UE and the second TRP sends a second part of the PDSCH (e.g., on a second set of layers with a second set of FDRA and a second set of TDRA) to the UE.

Referring back to FIG. 5, each DCI schedules an individual PDSCH in a multi-TRP multi-DCI scenario. For example, a first DCI (e.g., DCI 1) from a first TRP (e.g., TRP 1) (e.g., transmitted in a first PDCCH) schedules a first PSDCH (e.g., PDSCH 1) from the first TRP, while a second DCI (e.g., DCI 2) from a second TRP (e.g., TRP 2) (e.g., transmitted in a second PDCCH) schedules a second PSDCH (e.g., PDSCH 2) from the second TRP. The two scheduled PDSCHs may be overlapped, non-overlapped, or partially overlapped in a frequency domain or a time domain.

Example Aperiodic CSI-RS and SFN PDCCH

In certain wireless communication systems (e.g., Release 15 and 16 systems), rules may be provided for determination of a default beam for receiving aperiodic channel state information (CSI) reference signals (RSs), when a scheduling offset is less than a threshold (e.g., "beamSwitchTiming"). In some cases, the rules may depend on an operation mode of a wireless communication system (e.g., a multi downlink control information (multi-DCI) multi transmission reception point (multi-TRP) mode, a single DCI (single-DCI) multi-TRP mode, or a single-TRP mode). In some cases, the rules may depend on whether there is an overlapping of the aperiodic CSI-RSs with other downlink (DL) signals at same symbols.

In one example, a first parameter (e.g., "enableDefaultTCIStatePerCoresetPoolInd") associated with a multi-DCI multi-TPR mode is used for determination of the default beam for receiving the aperiodic CSI-RSs. In another example, a second parameter (e.g., "enableTwoDefaultTCIState") associated with a single-DCI multi-TRP mode is used for determination of the default beam for receiving the aperiodic CSI-RSs.

In some cases, when a scheduling time offset between a last symbol of a physical downlink control channel (PDCCH) carrying a triggering DCI and a first symbol of aperiodic CSI-RS resources in a non-zero power (NZP) CSI-RS resource set configured without a higher layer parameter (e.g., tracking reference signal information (trsInfo)) is smaller than a user equipment (UE) reported threshold time offset (e.g., "beamSwitchTiming"), the UE may have insufficient time to decode the DCI and determine a proper beam for a reception of CSI-RSs to change a receiver beam for the reception of the aperiodic CSI-RS. To account for such cases, the UE needs to buffer time-domain samples with a default receiver beam where specific rules (e.g., for determination of a default beam for receiving aperiodic CSI-RSs) are implemented at least when a first parameter is configured for both overlapping and non-overlapping DL signals. In some cases, the rules are implemented for a single-TRP for both overlapping and non-overlapping DL signals. In some cases, the rules are implemented at least when a default beam for a cross carrier scheduling (e.g., "enableDefaultBeamForCCS") is configured. In some cases, the threshold time offset includes a beam switching timing parameter reported to a base station (BS) as a capability of the UE.

In certain wireless communication systems (e.g., Release 17 system), a scheme for an enhanced reliability of PDCCH transmission from a multi-TRP system based on a single frequency network (SFN) transmission is provided. SFN refers to a broadcast network where several transmitters simultaneously send a same signal over a same frequency channel.

Figure 6:
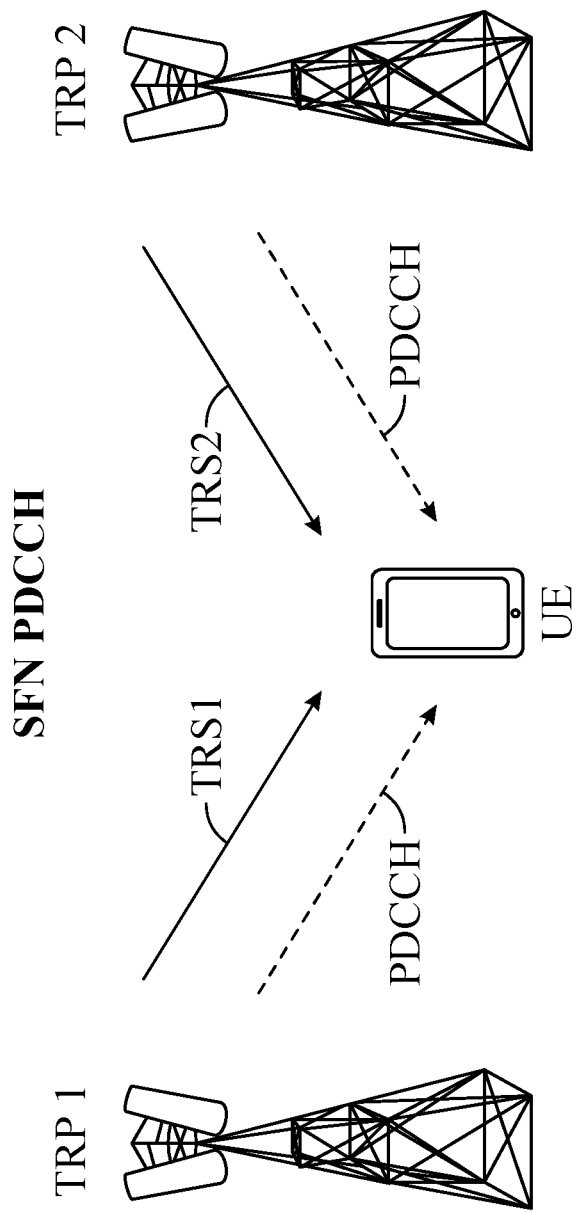
FIG. 6 illustrates example scenario of a physical downlink control channel (PDCCH) transmission from multiple TRPs based on a single frequency network (SFN) transmission, in accordance with certain aspects of the present disclosure.

For example, as illustrated in FIG. 6, a same PDCCH is simultaneously transmitted from both TRPs such as a first TRP (e.g., TRP 1) and a second TRP (e.g., TRP 2) on same time and frequency resources. This improves PDCCH reliability (e.g. a high mobility in a high speed train (HST) wireless communication system, a blockage, etc.). However, in some cases, a PDCCH transmission mode and a PDSCH transmission mode may not be the same.

In some cases, a control resource set (CORESET) is configured via a radio resource control (RRC) with a new higher layer parameter to indicate that a DCI/PDCCH received on the CORESET is a SFN.

In some cases, as illustrated in FIG. 7, a medium access control (MAC)-control element (CE) activation command indicates two transmission configuration indicator (TCI) states (such as a TCI state 1 and a TCI state 2). Also, for a SFN transmission of a PDCCH, variant E for quasi-colocation (QCL) assumption in supported in a TCI state when a tracking reference signal (TRS) or a CSI-RS is used as a source reference signal (RS) and is associated with QCL Type-A for a Doppler spread, a Doppler shift, a delay spread and/or an average delay properties.

As noted above, multi-TRP transmissions may be configured based on a single-DCI. In a SFN mode, CSI-RS is transmitted from one or more TRPs (associated with a BS) to a UE, using a mode 1 scheme (e.g., TRP-specific CSI-RS mode) or a mode 2 scheme (e.g., SFN CSI-RS mode).

Figure 8:
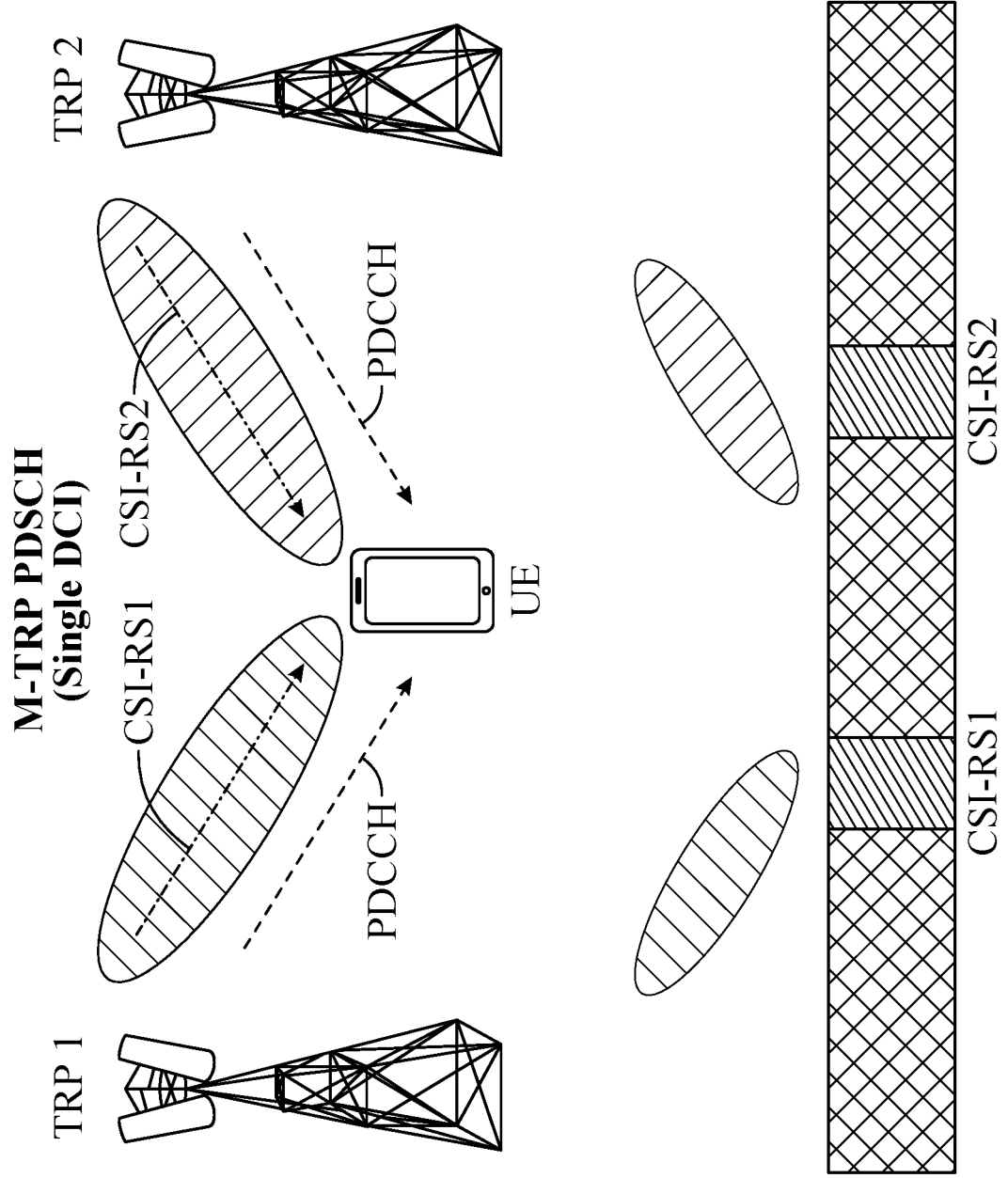
FIG. 8 illustrates example TRP-specific channel state information (CSI) reference signal (RS) mode in a single-DCI multi-TRP scenario, in accordance with certain aspects of the present disclosure.

As illustrated in FIG. 8, in the mode 1 scheme, CSI-RS resource per each TRP is associated with a single TCI state. For example, a first TRP (e.g., TRP 1) sends a first CSI-RS resource (e.g., CSI-RS 1) and a second TRP (e.g., TRP 2) sends a second CSI-RS resource (e.g., CSI-RS 2) to the UE.

Figure 9:
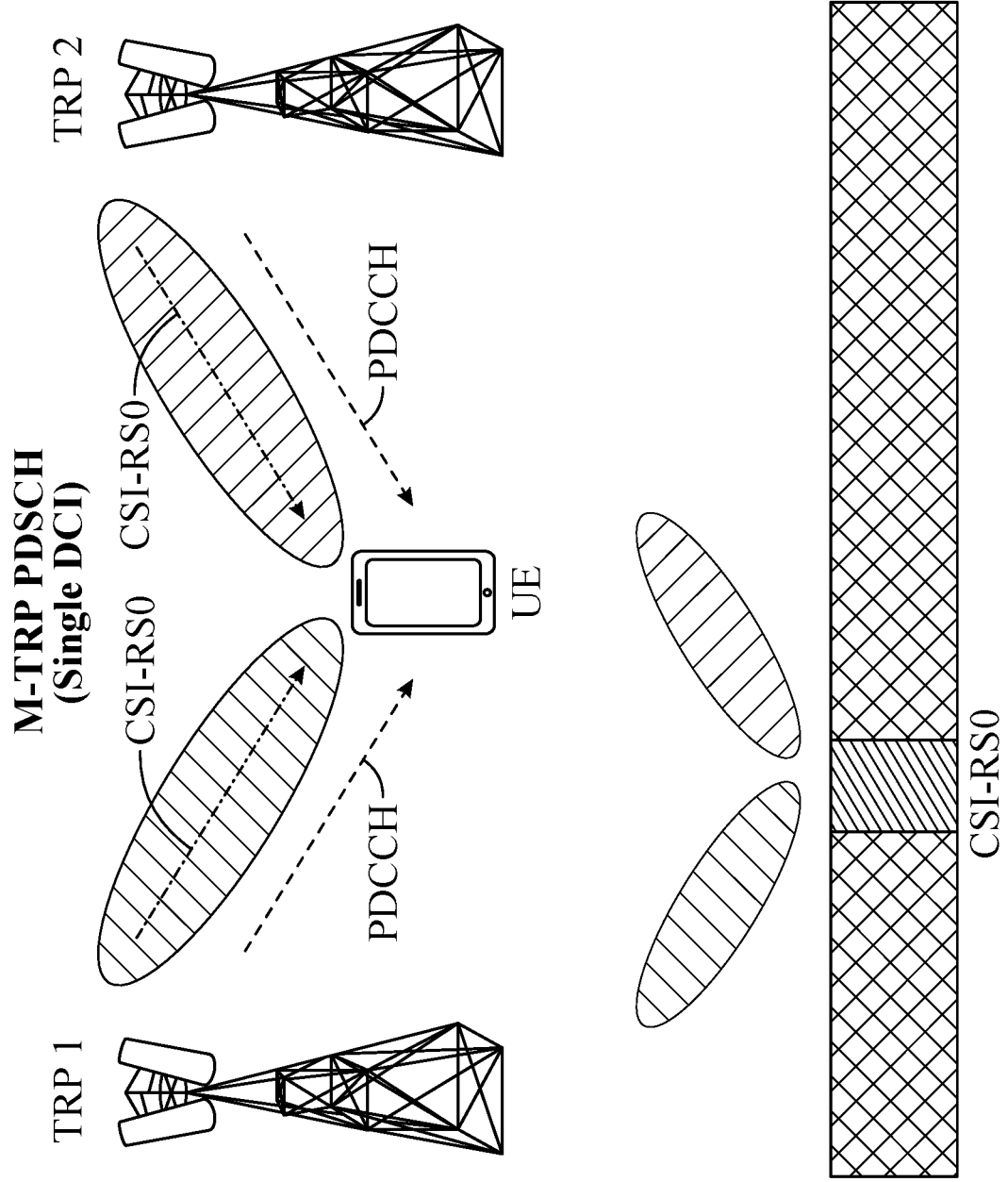
FIG. 9 illustrates example SFN CSI-RS mode in a single-DCI multi-TRP scenario, in accordance with certain aspects of the present disclosure.

As illustrated in FIG. 9, in the mode 2 scheme, a CSI-RS resource is transmitted from both TRPs (such as a first TRP (e.g., TRP 1) and a second TRP (e.g., TRP 2)) in a SFN manner and is associated with two TCI states. For example, both the first TRP and the second TRP send a same CSI-RS resource (e.g., CSI-RS 0) to the UE.

In certain wireless communication systems, when a CORESET is activated with two TCI states (and a PDCCH candidate is a SFN PDCCH), a UE may have to select one of the two TCI states (and corresponding QCL assumptions) for receiving and processing aperiodic CSI-RSs. Currently, there is no selection technique for the UE to select one of the two TCI states (and corresponding QCL assumptions) for receiving and processing the aperiodic CSI-RSs.

In some cases, there may be some DL signals or DL channels that are overlapping with the aperiodic CSI-RSs at same symbols. In such cases, if these DL signals/channels are activated with the two TCI states, then there is a need for a technique to determine a TCI state(s) of the aperiodic CSI-RSs.

In some cases, a PDCCH may be transmitted via SFN (e.g., the same PDCCH may be transmitted simultaneously from multiple TRPs) while a PDSCH is a multi-TRP operation (e.g., Release 16 system) in a single-DCI multi-TRP scenario (where a CORESET pool index is not configured). The multi-TRP operation may involve various transmission schemes such as a spatial division multiplexing (SDM) scheme, a frequency division multiplexing (FDM) scheme, and/or a time division multiplexing (TDM) scheme. In such cases, two CSI-RSs (one per each TRP) and each RS is received with a single beam/TCI state. In such cases, a UE may or may not have a capability of two TCI states (e.g., "TwoDefaultTCIState") to receive the two TCI states from a BS. In one example, a TDM scheme may have two TCIs but at certain symbols/slots only one beam is used for a PDSCH. In another example, for FDM/SDM schemes, a CSI-RS may be triggered at a same symbol.

In some cases, a PDCCH and PDSCH may both be transmitted via SFN (e.g., Release 17 system) in a single-DCI multi-TRP scenario (where a CORESET pool index is not configured). In such cases, a single CSI-RS is transmitted in a SFN mode from both TRPs. For example, a SFN CSI-RS may be received by either two beams (QCL-TypeD) (that are not supported in a specification) or a single beam (e.g., one of the beams of a PDSCH). In some cases, a UE may receive two CSI-RS resources (e.g., TRP-specific CSI-RS). In one example case, a single beam may be used for each CSI-RS (e.g., assuming TDM). In another example case, two beams are used if the two CSI-RS resources are SDM multiplexed at a same symbol(s).

In some cases, a PDCCH is transmitted via SFN, while a PDSCH is a single-TRP in a single-DCI multi-TRP scenario (e.g., where a CORESET pool index is not configured). In such cases, CSI-RS is from one TRP. Also, in such cases, a single beam is used for a reception of aperiodic CSI-RSs.

Example AP-CSI QCL Assumption with SFN PDCCH Transmission

Aspects of the present disclosure provide apparatuses, methods, processing systems, and computer readable mediums for determining and applying quasi-colocation (QCL) assumptions for receiving and processing aperiodic channel state information (CSI) reference signals (RSs) with a single frequency network (SFN) physical downlink control channel (PDCCH) transmission.

Figure 10:
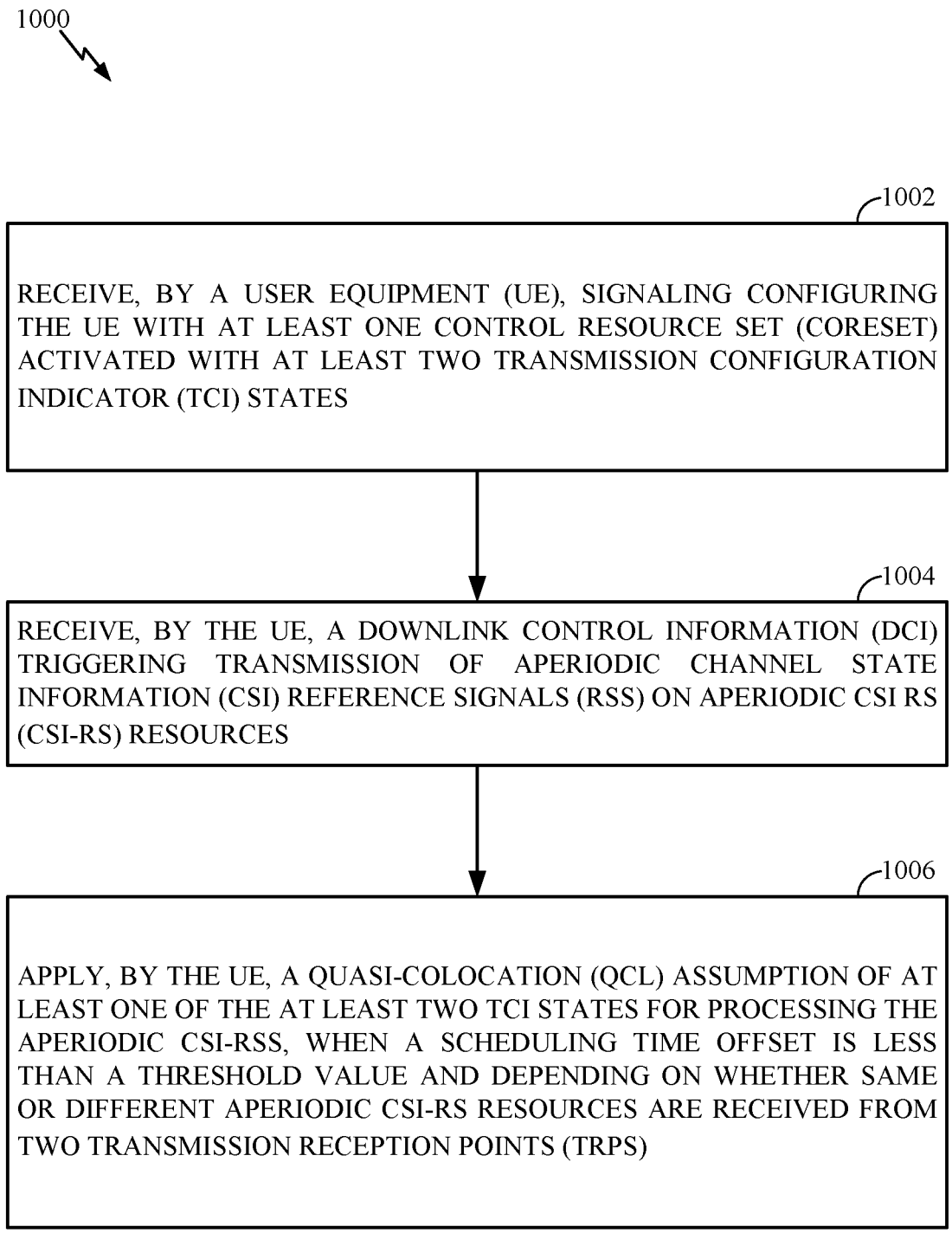
FIG. 10 is a flow diagram illustrating example operations for wireless communication by a UE, in accordance with certain aspects of the present disclosure.

FIG. 10 is a flow diagram illustrating example operations 1000 for wireless communication by a user equipment (UE), in accordance with certain aspects of the present disclosure. The operations 1000 may be performed, for example, by the UE 120a in the wireless communication network 100. The operations 1000 may be implemented as software components that are executed and run on one or more processors (e.g., the controller/processor 280 of FIG. 2). Further, the transmission and reception of signals by the UE in operations 1000 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1000 begin, at 1002, by receiving signaling configuring the UE with at least one control resource set (CORESET) activated with at least two transmission configuration indicator (TCI) states. For example, the UE may receive the signaling configuring the UE with the at least one CORESET using antenna(s) and receiver/transceiver components of the UE 120a shown in FIG. 1 or FIG. 2 and/or of the apparatus shown in FIG. 16.

At 1004, the UE receives a downlink control information (DCI) triggering transmission of aperiodic CSI-RSs on aperiodic CSI-RS resources. For example, the UE may receive the DCI using antenna(s) and receiver/transceiver components of the UE 120a shown in FIG. 1 or FIG. 2 and/or of the apparatus shown in FIG. 16.

At 1006, the UE applies a QCL assumption of at least one of the at least two TCI states for processing the aperiodic CSI-RSs, when a scheduling time offset is less than a threshold value and depending on whether same or different aperiodic CSI-RS resources are received from two transmission reception points (TRPs). For example, the UE may apply the QCL assumption of the at least one of the at least two TCI states for processing the aperiodic CSI-RSs using a processor of the UE 120a shown in FIG. 1 or FIG. 2 and/or of the apparatus shown in FIG. 16. In certain aspects, the QCL assumption contains QCL-TypeD, which is used by the UE to determine one or more receive beams of the aperiodic CSI-RSs. The UE then uses the determined one or more receive beams for receiving and processing the aperiodic CSI-RSs.

Figure 11:
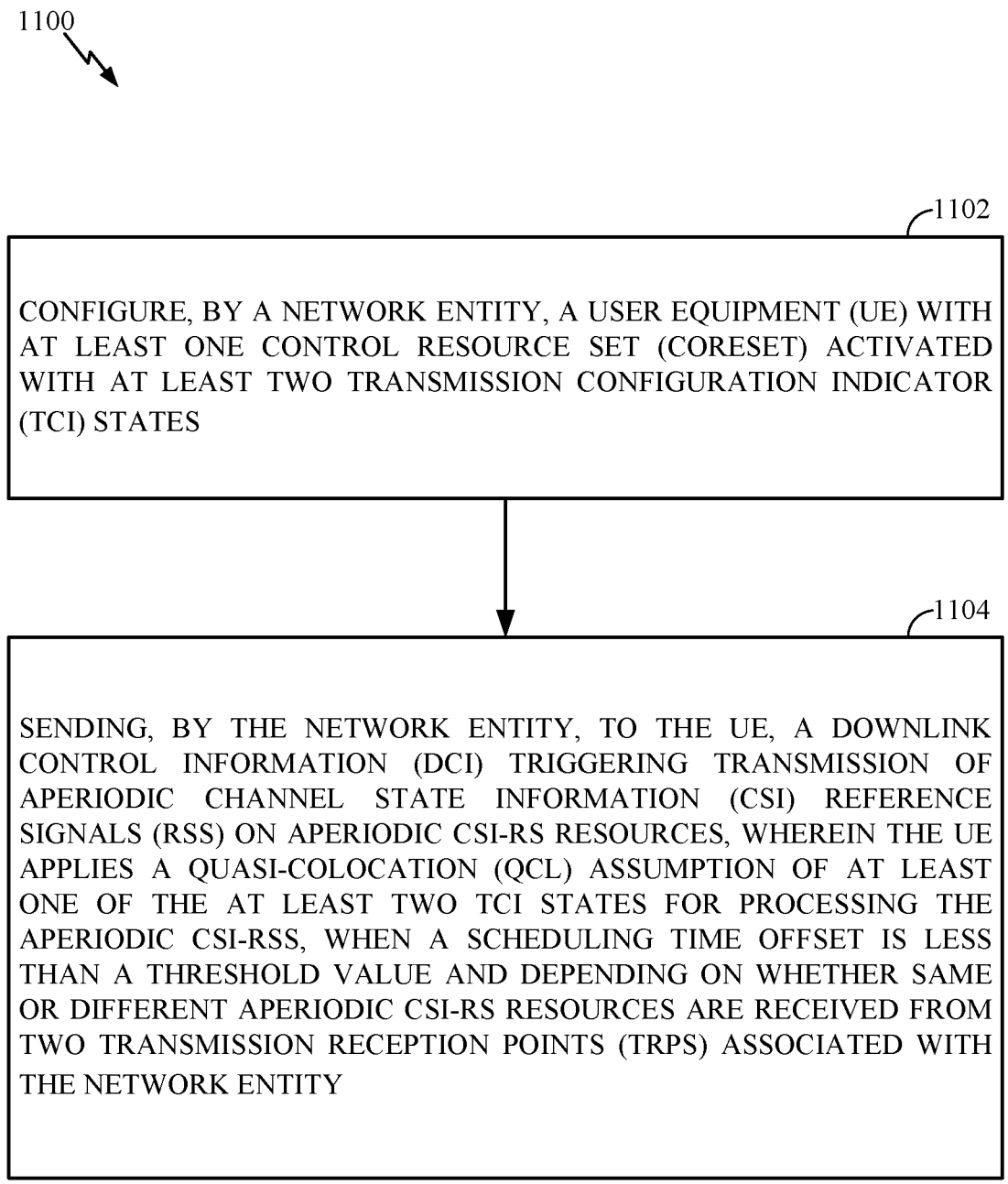
FIG. 11 is a flow diagram illustrating example operations for wireless communication by a network entity, in accordance with certain aspects of the present disclosure.

FIG. 11 is a flow diagram illustrating example operations 1100 for wireless communication by a network entity, in accordance with certain aspects of the present disclosure. For example, the operations 1100 may be performed by the network entity (e.g., such as the BS 110a in the wireless communication network 100). The operations 1100 may be implemented as software components that are executed and run on one or more processors (e.g., the controller/processor 240 of FIG. 2). Further, the transmission and reception of signals by the network entity in operations 1100 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1100 begin, at 1102, by configuring a UE with at least one CORESET activated with at least two TCI states. For example, the network entity may configure the UE using a processor, antenna(s) and transmitter/transceiver components of the BS 110a shown in FIG. 1 or FIG. 2 and/or of the apparatus shown in FIG. 17.

At 1104, the network entity sends, to the UE, a DCI triggering transmission of aperiodic CSI-RSs on aperiodic CSI-RS resources where the UE applies a QCL assumption of at least one of the at least two TCI states for processing the aperiodic CSI-RSs, when a scheduling time offset is less than a threshold value and depending on whether same or different aperiodic CSI-RS resources are received from two TRPs associated with the network entity. For example, the network entity may send the DCI using antenna(s) and transmitter/transceiver components of the BS 110a shown in FIG. 1 or FIG. 2 and/or of the apparatus shown in FIG. 17.

In certain aspects, the scheduling time offset includes a time offset between the DCI and the aperiodic CSI-RS resources. For example, the time offset is between a reception of the DCI and the aperiodic CSI-RS resources. In certain aspects, the threshold value is equal to the UE reported threshold (e.g. the UE reported threshold "beamSwitchTiming").

In certain aspects, the UE applies one or more QCL assumptions of one of the at least two TCI states of the at least one CORESET for processing the aperiodic CSI-RSs (e.g., when the scheduling time offset is less than the threshold value, the at least one CORESET is activated with the at least two TCI states, each aperiodic CSI-RS resource is for one TRP and associated with a single TCI state of the at least two TCI states, and/or a single beam receives the aperiodic CSI-RS resources).

For example, when the scheduling time offset between a last symbol of a PDCCH (e.g., from one or more TRPs associated with a base station (BS)) carrying a triggering DCI and a first symbol of the aperiodic CSI-RS resources (e.g., from the one or more TRPs) is less than the threshold value (e.g., such as the "beamSwitchTiming" value), the CORESET associated with a monitored search space with a lowest CORESET-ID (e.g., such as a "controlResourceSetId") in a latest slot is activated with the at least two TCI states, and the single beam receives the aperiodic CSI-RS resources (e.g., TRP-specific CSI-RS), then the UE applies the QCL assumption of one of the at least two TCI states (e.g., two TCI states) when receiving and processing the aperiodic CSI-RSs. In other words, at least when the CORESET with the lowest CORESET-ID is a SFN with the two TCI states and the CSI-RS is for one TRP, then the UE applies the QCL assumption of one of the two TCI states when receiving and processing the aperiodic CSI-RSs. In some cases, there is an alignment with a default beam for a physical downlink shared channel (PDSCH) as well.

In certain aspects, when the UE applies the QCL assumption of the one of the at least two TCI states (e.g., including a first TCI state and a second TCI state) for processing the aperiodic CSI-RSs, the one of the at least two TCI states may include the first TCI state. In certain aspects, the one of the at least two TCI states may include the second TCI state.

In certain aspects, when the UE applies the QCL assumption of the one of the at least two TCI states for processing the aperiodic CSI-RSs, the one of the at least two TCI states includes a TCI state with a lowest TCI state identity document (ID). In certain aspects, the one of the at least two TCI states includes a TCI state with a highest TCI state ID.

In certain aspects, when the UE applies the QCL assumption of the one of the at least two TCI states for processing the aperiodic CSI-RSs, the one of the at least two TCI states is identical to a TCI state for the aperiodic CSI-RSs. For example, the one of the at least two TCI states is the TCI state that is identical to an indicated TCI state for the aperiodic CSI-RSs in a CSI triggering state.

In certain aspects, when the UE applies the QCL assumption of the one of the at least two TCI states for processing the aperiodic CSI-RSs, the one of the at least two TCI states includes a TCI state of an anchor TRP (e.g., when a Doppler shift pre-compensation is enabled for a reception of a PDCCH carrying a downlink (DL) DCI). The TCI state of the anchor TRP have a QCL-Type A or a QCL-Type B. In one example, a TRP among a group of TRPs that is most closely located to the UE is considered the anchor TRP. In another example, the TRP among the group of TRPs that have a strongest tracking reference signal (TRS) is considered the anchor TRP.

In certain aspects, when the UE applies the QCL assumption of the one of the at least two TCI states for processing the aperiodic CSI-RSs, the one of the at least two TCI states includes a TCI state that have a QCL-Type E (e.g., when the Doppler shift pre-compensation is enabled for the reception of the PDCCH carrying the DL DCI). This TCI state (QCL-Type E) does not include QCL information for a Doppler shift and a Doppler spread, and contains only a delay spread and an average delay.

In certain aspects, the UE applies one or more QCL assumptions of the at least two TCI states for processing the aperiodic CSI-RSs (e.g., when the scheduling time offset is less than the threshold value, the at least one CORESET is activated with the at least two TCI states, a same aperiodic CSI-RS resource is received from the two TRPs and associated with the at least two TCI states, and dual beams receive the aperiodic CSI-RS resources).

For example, when the scheduling time offset between the last symbol of the PDCCH (e.g., from the one or more TRPs associated with the BS) carrying the triggering DCI and the first symbol of the aperiodic CSI-RS resources (e.g., from the one or more TRPs) is less than the threshold value (e.g., such as the "beamSwitchTiming" value), the CORESET associated with the monitored search space with the lowest CORESET-ID (e.g., such as the "controlResourceSetId") in the latest slot is activated with the at least two TCI states, and the two beams receive the aperiodic CSI-RS resources (e.g., SFN CSI-RS), the UE applies the QCL assumption of both the at least two TCI states (e.g., two TCI states) when receiving and processing the aperiodic CSI-RSs. In other words, at least when the CORESET with the lowest CORESET-ID is the SFN with the two TCI states and the CSI-RS is the SFN, the UE applies the QCL assumption of both the two TCI states when receiving and processing the aperiodic CSI-RSs. In some cases, there is an alignment with a default beam for PDSCH as well.

In certain aspects, each TCI state may be associated with a QCL-TypeD (i.e., a receive beam) for receiving the aperiodic CSI-RSs.

Figure 12:
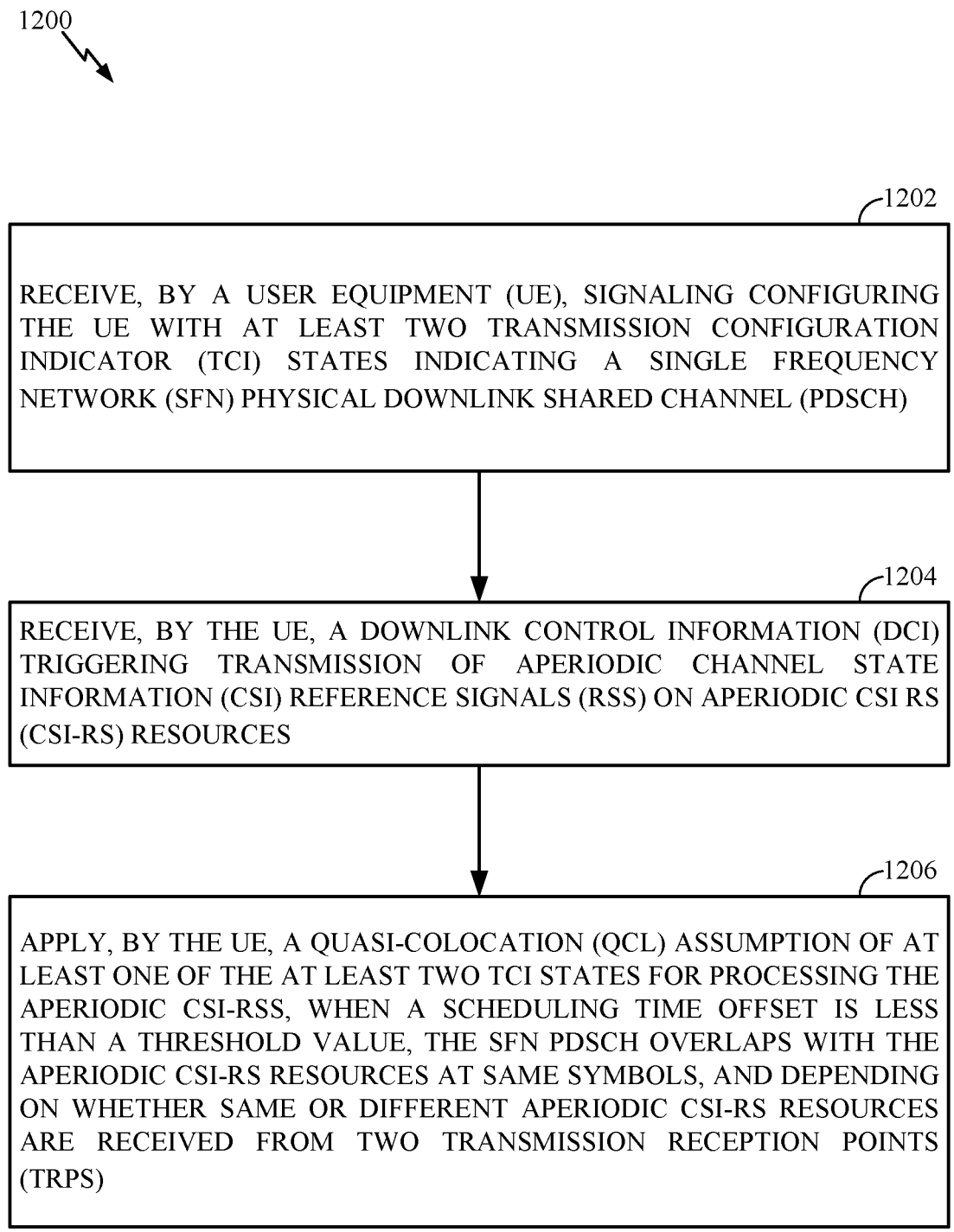
FIG. 12 is a flow diagram illustrating example operations for wireless communication by a UE, in accordance with certain aspects of the present disclosure.

FIG. 12 is a flow diagram illustrating example operations 1200 for wireless communication by a UE, in accordance with certain aspects of the present disclosure. The operations 1200 may be performed, for example, by the UE 120a in the wireless communication network 100. The operations 1200 may be implemented as software components that are executed and run on one or more processors (e.g., the controller/processor 280 of FIG. 2). Further, the transmission and reception of signals by the UE in operations 1200 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1200 begin, at 1202, by receiving signaling configuring the UE with at least two TCI states indicating a SFN PDSCH (e.g., a PDSCH transmitted simultaneously from different TRPs). For example, the UE may receive the signaling configuring the UE with the at least two TCI states using antenna(s) and receiver/transceiver components of the UE 120*a* shown in FIG. 1 or FIG. 2 and/or of the apparatus shown in FIG. 18.

At 1204, the UE receives a DCI triggering transmission of aperiodic CSI-RSs on aperiodic CSI-RS resources. For example, the UE may receive the DCI using antenna(s) and receiver/transceiver components of the UE 120*a* shown in FIG. 1 or FIG. 2 and/or of the apparatus shown in FIG. 18.

At 1206, the UE applies a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs. For example, the UE may apply the QCL assumption of the at least one of the at least two TCI states for processing the aperiodic CSI-RSs using a processor of the UE 120*a* shown in FIG. 1 or FIG. 2 and/or of the apparatus shown in FIG. 18.

Figure 13:
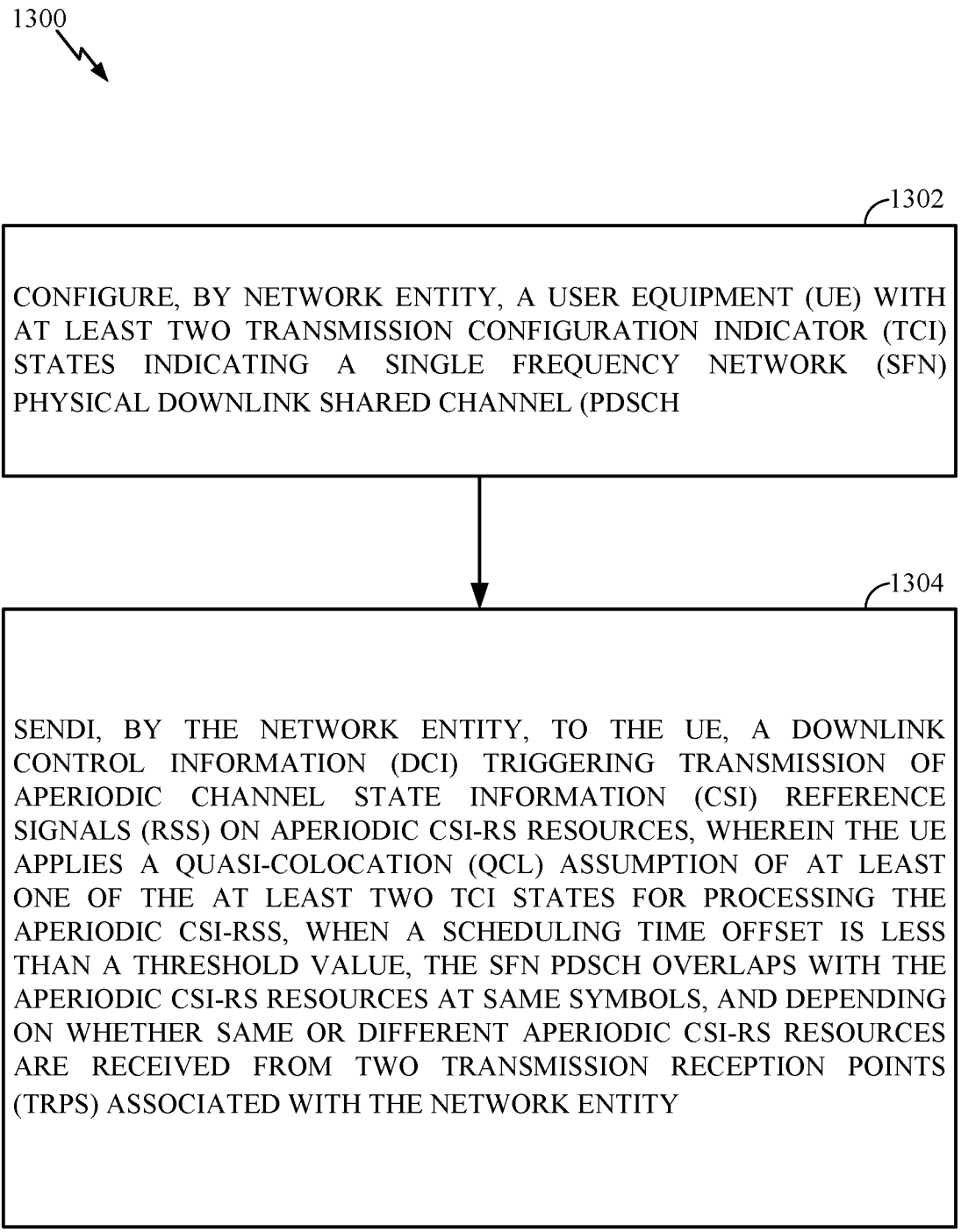
FIG. 13 is a flow diagram illustrating example operations for wireless communication by a network entity, in accordance with certain aspects of the present disclosure.

FIG. 13 is a flow diagram illustrating example operations 1300 for wireless communication by a network entity, in accordance with certain aspects of the present disclosure. For example, the operations 1300 may be performed by the network entity (e.g., such as the BS 110*a* in the wireless communication network 100). The operations 1300 may be implemented as software components that are executed and run on one or more processors (e.g., the controller/processor 240 of FIG. 2). Further, the transmission and reception of signals by the network entity in operations 1300 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1300 begin, at 1302, by configuring a UE with at least two TCI states indicating a SFN PDSCH. For example, the network entity may configure the UE using a processor, antenna(s) and transmitter/transceiver components of the BS 110*a* shown in FIG. 1 or FIG. 2 and/or of the apparatus shown in FIG. 19.

At 1304, the network entity sends, to the UE, a DCI triggering transmission of aperiodic CSI-RSs on aperiodic CSI-RS resources where the UE applies a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs associated with the network entity. For example, the network entity may send the DCI using antenna(s) and transmitter/transceiver components of the BS 110*a* shown in FIG. 1 or FIG. 2 and/or of the apparatus shown in FIG. 19.

In certain aspects, the scheduling time offset includes a time offset between the DCI and the aperiodic CSI-RS resources. For example, the time offset is between a reception of the DCI and the aperiodic CSI-RS resources. In certain aspects, the threshold value is equal to the UE reported threshold (e.g., the UE reported threshold "beamSwitchTiming").

In certain aspects, the UE applies one or more QCL assumptions of one of the at least two TCI states for processing the aperiodic CSI-RSs (e.g., when the scheduling time offset is less than the threshold value, the UE is configured with the at least two TCI states, the SFN PDSCH overlaps with the aperiodic CSI-RS resources at the same symbols, each aperiodic CSI-RS resource is for one TRP and associated with a single TCI state of the at least two TCI states, and/or a single beam receives the aperiodic CSI-RS resources).

For example, when the scheduling time offset between a last symbol of a PDCCH (e.g., from one or more TRPs associated with a BS) carrying a triggering DCI and a first symbol of the aperiodic CSI-RS resources (e.g., from the one or more TRPs) is less than the threshold value (e.g., such as the "beamSwitchTiming" value), the UE is configured with the two TCI states (e.g., such as "enable TwoDefault-TCIStates"), the SFN PDSCH with two indicated TCI states is in the same symbols as the CSI-RS, and the single beam receives the aperiodic CSI-RS resources (e.g., TRP-specific CSI-RS), the UE applies the QCL assumption of one of the at least two TCI states (e.g., two TCI states) when receiving and processing the aperiodic CSI-RSs. In other words, the UE applies the QCL assumption of one of the two TCI states when receiving and processing the aperiodic CSI-RSs (e.g., at least when a dynamic switching between the SFN PDSCH and a single-TRP is enabled, and the BS triggers the aperiodic CSI-RSs for the single-TPR that overlaps with the SFN PDSCH at the same symbols).

In certain aspects, when the UE applies the QCL assumption of the one of the at least two TCI states for processing the aperiodic CSI-RSs, the one of the at least two TCI states includes a TCI state that is mapped to an anchor TRP (e.g., when a TRP pre-compensation is enabled). For example, the UE applies the QCL assumption of the TCI state mapped to the anchor TRP (e.g., when the SFN PDSCH w/ TRP pre-compensation overlaps with the CSI-RS). In one example, a TRP among a group of TRPs that is most closely located to the UE is considered the anchor TRP. In another example, the TRP among the group of TRPs that have a strongest TRS is considered the anchor TRP.

In certain aspects, when the UE applies the QCL assumption of the one of the at least two TCI states (e.g., including a first TCI state and a second TCI state) for processing the aperiodic CSI-RSs, the one of the at least two TCI states includes the first TCI state with a lowest TCI state identity document (ID). For example, the one of the at least two TCI states includes the first TCI state of two TCIs of a PDSCH.

In certain aspects, when the UE applies the QCL assumption of the one of the at least two TCI states for processing the aperiodic CSI-RSs, the one of the at least two TCI states is identical to a TCI state for the aperiodic CSI-RSs. For example, the UE applies the QCL assumption of the TCI state that is identical to an indicated TCI state for the aperiodic CSI-RS. In some cases, the DCI from the one or more TRPs is decoded prior to receiving the CSI-RS from the one or more TRPs.

In certain aspects, the UE applies one or more QCL assumptions of the at least two TCI states for processing the aperiodic CSI-RSs (e.g., when the scheduling time offset is less than the threshold value, the UE is configured with the at least two TCI states, the SFN PDSCH overlaps with the aperiodic CSI-RS resources at the same symbols, a same aperiodic CSI-RS resource is received from the two TRPs and associated with the at least two TCI states, and/or dual beams receive the aperiodic CSI-RS resources).

For example, when the scheduling time offset between the last symbol of the PDCCH (e.g., from the one or more TRPs associated with the BS) carrying the triggering DCI and the first symbol of the aperiodic CSI-RS resources (e.g., from the one or more TRPs) is less than the threshold value (e.g., such as the "beamSwitchTiming" value), the UE is configured with the two TCI states (e.g., such the "enable Two-DefaultTCIStates"), the SFN PDSCH with the two indicated TCI states is in the same symbols as the CSI-RS, and the two beams receive the aperiodic CSI-RS resources (e.g., SFN CSI-RS), the UE applies the QCL assumption of both the at least two TCI states (e.g., two TCI states) when receiving and processing the aperiodic CSI-RSs.

In certain aspects, each TCI state is associated with a QCL-TypeD (i.e., a receive beam) for receiving the aperiodic CSI-RSs.

Figure 14:
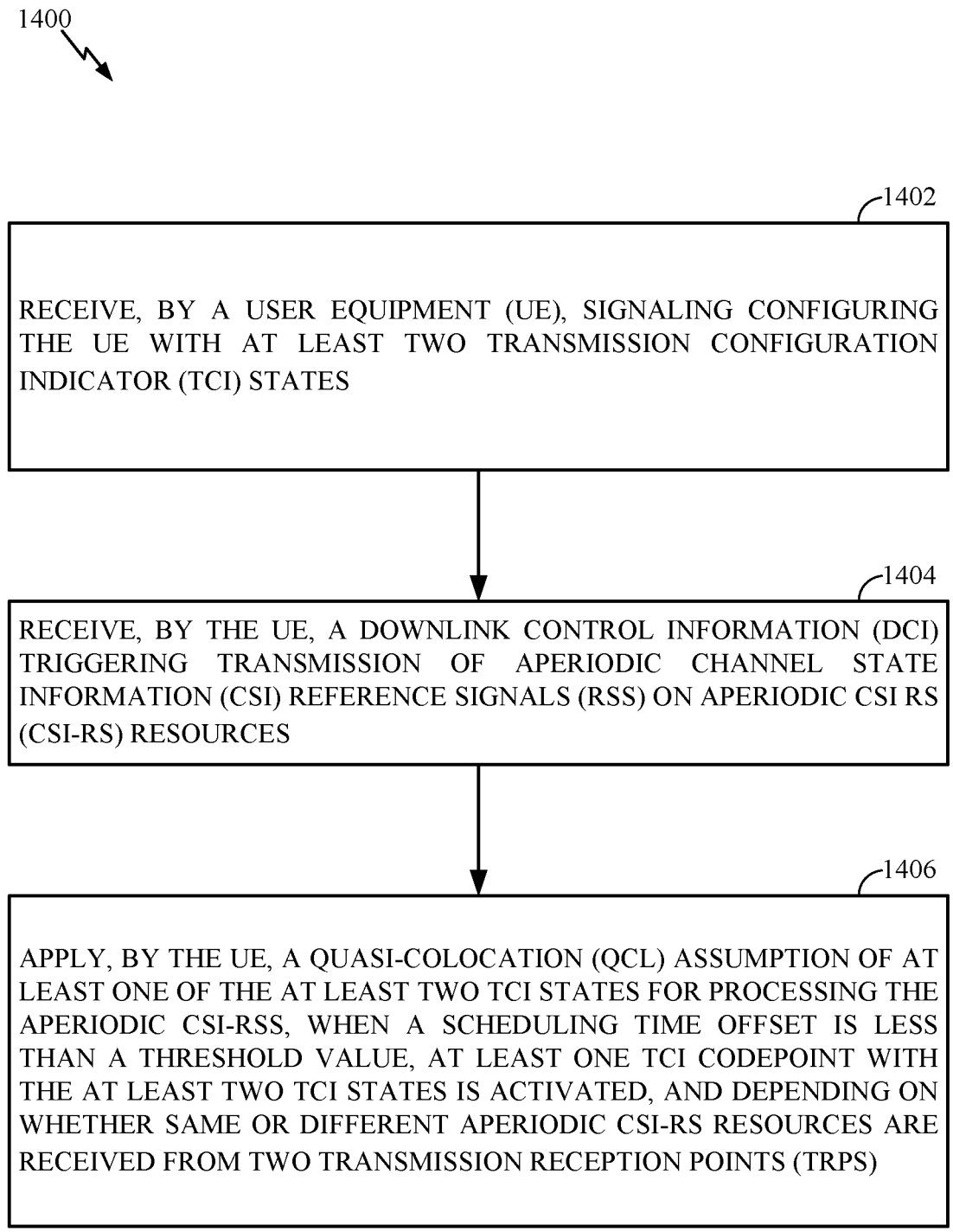
FIG. 14 is a flow diagram illustrating example operations for wireless communication by a UE, in accordance with certain aspects of the present disclosure.

FIG. 14 is a flow diagram illustrating example operations 1400 for wireless communication by a UE, in accordance with certain aspects of the present disclosure. The operations 1400 may be performed, for example, by the UE 120a in the wireless communication network 100. The operations 1400 may be implemented as software components that are executed and run on one or more processors (e.g., the controller/processor 280 of FIG. 2). Further, the transmission and reception of signals by the UE in operations 1200 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1400 begin, at 1402, by receiving signaling configuring the UE with at least two TCI states. For example, the UE may receive the signaling configuring the UE with the at least two TCI states using antenna(s) and receiver/transceiver components of the UE 120a shown in FIG. 1 or FIG. 2 and/or of the apparatus shown in FIG. 20.

At 1404, the UE receives a DCI triggering transmission of aperiodic CSI-RS on aperiodic CSI-RS resources. For example, the UE may receive the DCI using antenna(s) and receiver/transceiver components of the UE 120a shown in FIG. 1 or FIG. 2 and/or of the apparatus shown in FIG. 20.

At 1406, the UE applies a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs. For example, the UE may apply the QCL assumption of the at least one of the at least two TCI states for processing the aperiodic CSI-RSs using a processor of the UE 120a shown in FIG. 1 or FIG. 2 and/or of the apparatus shown in FIG. 20.

Figure 15:
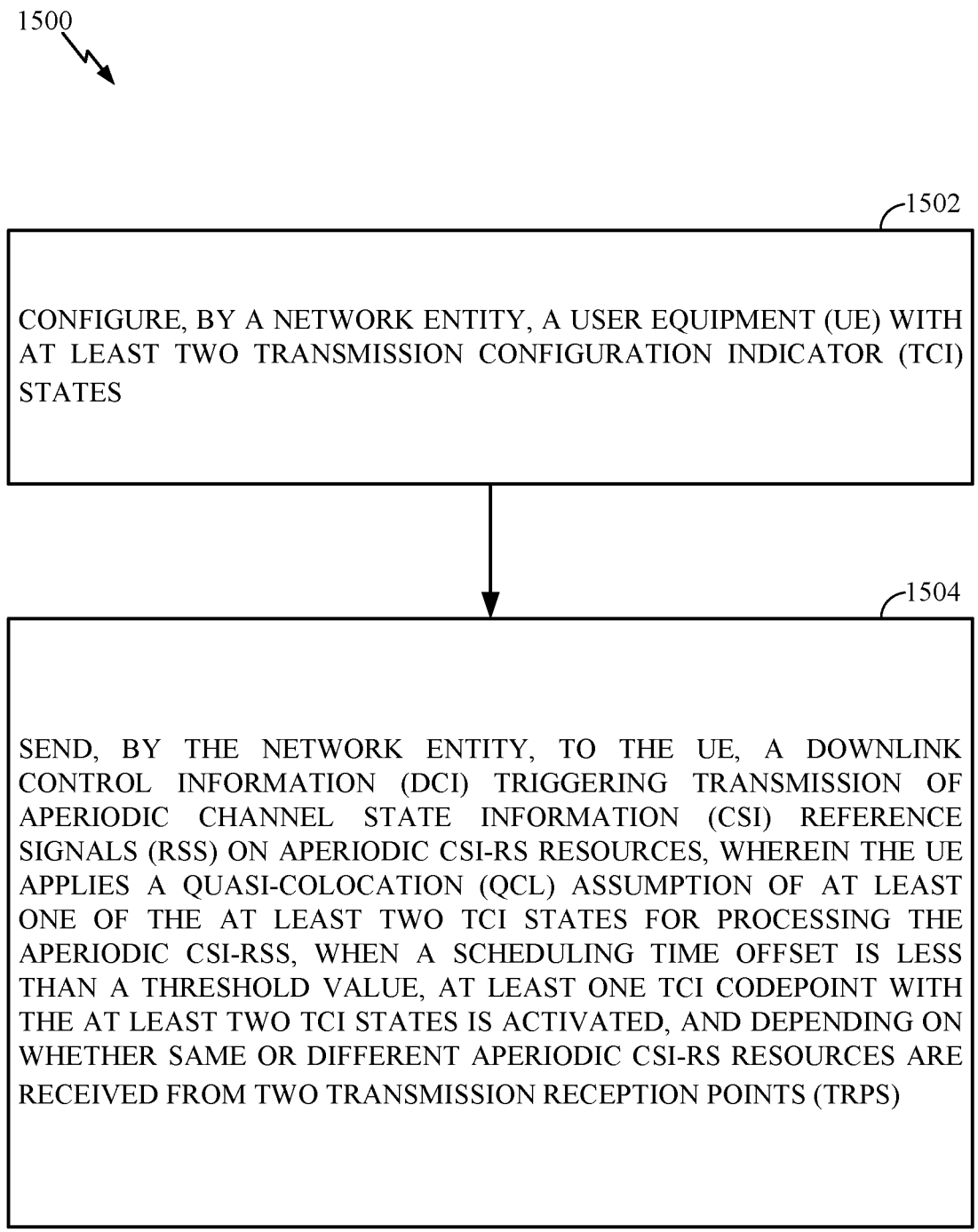
FIG. 15 is a flow diagram illustrating example operations for wireless communication by a network entity, in accordance with certain aspects of the present disclosure.

FIG. 15 is a flow diagram illustrating example operations 1500 for wireless communication by a network entity, in accordance with certain aspects of the present disclosure. For example, the operations 1500 may be performed by the network entity (e.g., such as the BS 110a in the wireless communication network 100). The operations 1500 may be implemented as software components that are executed and run on one or more processors (e.g., the controller/processor 240 of FIG. 2). Further, the transmission and reception of signals by the network entity in operations 1500 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1500 begin, at 1502, by configuring a UE with at least two TCI states. For example, the network entity may configure the UE using a processor, antenna(s) and transmitter/transceiver components of the BS 110a shown in FIG. 1 or FIG. 2 and/or of the apparatus shown in FIG. 21.

At 1504, the network entity sends, to the UE, a DCI triggering transmission of aperiodic CSI-RSs on aperiodic CSI-RS resources where the UE applies a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs associated with the network entity. For example, the network entity may send the DCI using antenna(s) and transmitter/transceiver components of the BS 110a shown in FIG. 1 or FIG. 2 and/or of the apparatus shown in FIG. 21.

In certain aspects, the scheduling time offset includes a time offset between the DCI and the aperiodic CSI-RS resources. For example, the time offset is between a reception of the DCI and the aperiodic CSI-RS resources. In certain aspects, the threshold value is equal to the UE reported threshold (e.g., the UE reported threshold "beamSwitchTiming").

In certain aspects, a MAC-CE activates the at least one TCI codepoint with the at least two TCI states.

In certain aspects, the UE applies one or more QCL assumptions of one of the at least two TCI states for processing the aperiodic CSI-RSs (e.g., when the scheduling time offset is less than the threshold value, the UE is configured with the at least two TCI states, the at least one TCI codepoint with the at least two TCI states is activated, each aperiodic CSI-RS resource is for one TRP and associated with a single TCI state of the at least two TCI states, and/or a single beam receives the aperiodic CSI-RS resources).

For example, when the scheduling time offset between a last symbol of a PDCCH (e.g., from one or more TRPs associated with a BS) carrying a triggering DCI and a first symbol of the aperiodic CSI-RS resources (e.g., from the one or more TRPs) is less than the threshold value (e.g., such as the "beamSwitchTiming" value), the UE is configured with the two TCI states (e.g., such as "enableTwoDefault-TCIStates"), the MAC-CE activates the at least one TCI codepoint with the two TCI states, and the single beam receives the aperiodic CSI-RS resources (e.g., TRP-specific CSI-RS), the UE applies the QCL assumption of one of the at least two TCI states (e.g., two TCI states) when receiving and processing the aperiodic CSI-RSs. In other words, when a SFN PDSCH where at least the MAC-CE activates the at least one TCI codepoint with the two TCI states and the CSI-RS is for one TRP, the UE applies the QCL assumption of one of the two TCI states when receiving and processing the aperiodic CSI-RSs. In some cases, there is an alignment with a default beam for PDSCH as well.

In certain aspects, when the UE applies the QCL assumption of the one of the at least two TCI states (e.g., including a first TCI state and a second TCI state) for processing the aperiodic CSI-RSs, the one of the at least two TCI states includes the first TCI state corresponding to a lowest TCI codepoint.

In certain aspects, when the UE applies the QCL assumption of the one of the at least two TCI states for processing the aperiodic CSI-RSs, the one of the at least two TCI states includes a TCI state of an anchor TRP (e.g., when a TRP pre-compensation is enabled). The TCI state of the anchor TRP have a QCL-Type A or a QCL-Type B. In one example, a TRP among a group of TRPs that is most closely located to the UE is considered the anchor TRP. In another example, the TRP among the group of TRPs that have a strongest TRS is considered the anchor TRP.

In certain aspects, when the UE applies the QCL assumption of the one of the at least two TCI states for processing the aperiodic CSI-RSs, the one of the at least two TCI states includes a TCI state having a QCL-Type E (e.g., when a TRP pre-compensation is enabled). This TCI state (QCL-Type E) does not include QCL information for a Doppler shift and a Doppler spread.

In certain aspects, the UE applies one or more QCL assumptions of the at least two TCI states for processing the aperiodic CSI-RSs (e.g., when the scheduling time offset is less than the threshold value, the UE is configured with the at least two TCI states, the at least one TCI codepoint with the at least two TCI states is activated, when a same aperiodic CSI-RS resource is received from the two TRPs and associated with the at least two TCI states, and/or dual beams receive the aperiodic CSI-RS resources).

For example, when the scheduling time offset between the last symbol of the PDCCH (e.g., from the one or more TRPs associated with the BS) carrying the triggering DCI and the first symbol of the aperiodic CSI-RS resources (e.g., from the one or more TRPs) is less than the threshold value (e.g., such as the "beamSwitchTiming" value), the UE is configured with the two TCI states (e.g., such as the "enable TwoDefaultTCIStates"), the MAC-CE activates the at least one TCI codepoint with the two TCI states, and the dual beams receive the aperiodic CSI-RS resources (e.g., SFN CSI-RS), the UE applies the QCL assumption of both the at least two TCI states (e.g., two TCI states) when receiving and processing the aperiodic CSI-RSs.

In certain aspects, when the UE applies the QCL assumption of the at least two TCI states for processing the aperiodic CSI-RSs, the at least two TCI states have lowest TCI codepoints. In certain aspects, the at least two TCI states have highest TCI codepoints.

In certain aspects, when the UE applies the QCL assumption of the at least two TCI states for processing the aperiodic CSI-RSs, the at least two TCI states have lowest TCI state IDs. In certain aspects, the at least two TCI states have highest TCI state IDs.

In certain aspects, when the UE applies the QCL assumption of the at least two TCI states for processing the aperiodic CSI-RSs, the at least two TCI states corresponding to lowest or highest TCI codepoints have different QCL assumptions (e.g., when a TRP pre-compensation is enabled). For example, the two TCI states (e.g., corresponding to the lowest or highest TCI codepoints) have different QCL assumptions (e.g., such as TypeA+TypeE, TypeB or TypeE).

In certain aspects, when the UE applies the QCL assumption of the at least two TCI states for processing the aperiodic CSI-RSs, the at least two TCI states corresponding to lowest or highest TCI state IDs have different QCL assumptions (e.g., when a TRP pre-compensation is enabled). For example, the two TCI states of a TCI codepoint including the lowest or highest TCI state ID have different QCL assumptions (e.g., such as TypeA+TypeE, TypeB or TypeE).

Example Wireless Communication Devices

Figure 16:
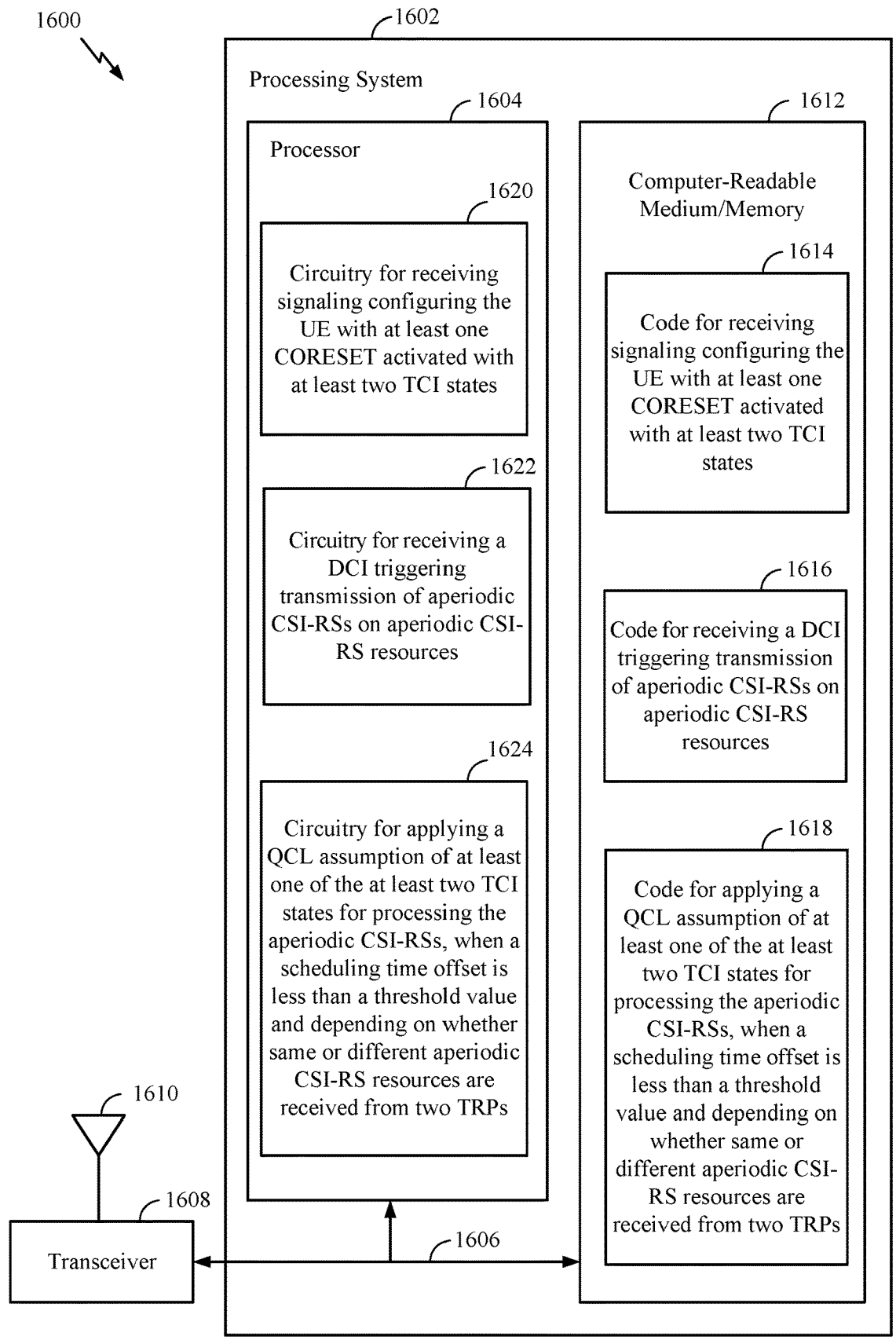
FIGS. 16-21 illustrate a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 10. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 is configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., a computer-executable code) that when executed by the processor 1604, cause the processor 1604 to perform the operations illustrated in FIG. 10, or other operations for performing the various techniques discussed herein. In certain aspects, computer-readable medium/memory 1612 stores code 1614 for receiving, code 1616 for receiving, and code 1618 for applying. The code 1614 for receiving may include code for receiving signaling configuring the UE with at least one control resource set (CORESET) activated with at least two transmission configuration indicator (TCI) states. The code 1616 for receiving may include code for receiving a downlink control information (DCI) triggering transmission of aperiodic channel state information (CSI) reference signals (RSs) on aperiodic CSI RS (CSI-RS) resources. The code 1618 for applying may include code for applying a quasi-colocation (QCL) assumption of at least one of the at least two TCI states for processing the aperiodic CSI-RSs, when a scheduling time offset is less than a threshold value and depending on whether same or different aperiodic CSI-RS resources are received from two transmission reception points (TRPs).

The processor 1604 may include circuitry configured to implement the code stored in the computer-readable medium/memory 1612, such as for performing the operations illustrated in FIG. 10, as well as other operations for performing the various techniques discussed herein. For example, the processor 1604 includes circuitry 1620 for receiving, circuitry 1622 for receiving, and circuitry 1624 for applying. The circuitry 1620 for receiving may include circuitry for receiving signaling configuring the UE with at least one CORESET activated with at least two TCI states. The circuitry 1622 for receiving may include circuitry for receiving a DCI triggering transmission of aperiodic CSI-RSs on aperiodic CSI-RS resources. The circuitry 1624 for applying may include circuitry for applying a QCL assumption of at least one of the at least two TCI states for processing the aperiodic CSI-RSs, when a scheduling time offset is less than a threshold value and depending on whether same or different aperiodic CSI-RS resources are received from two TRPs.

Figure 17:
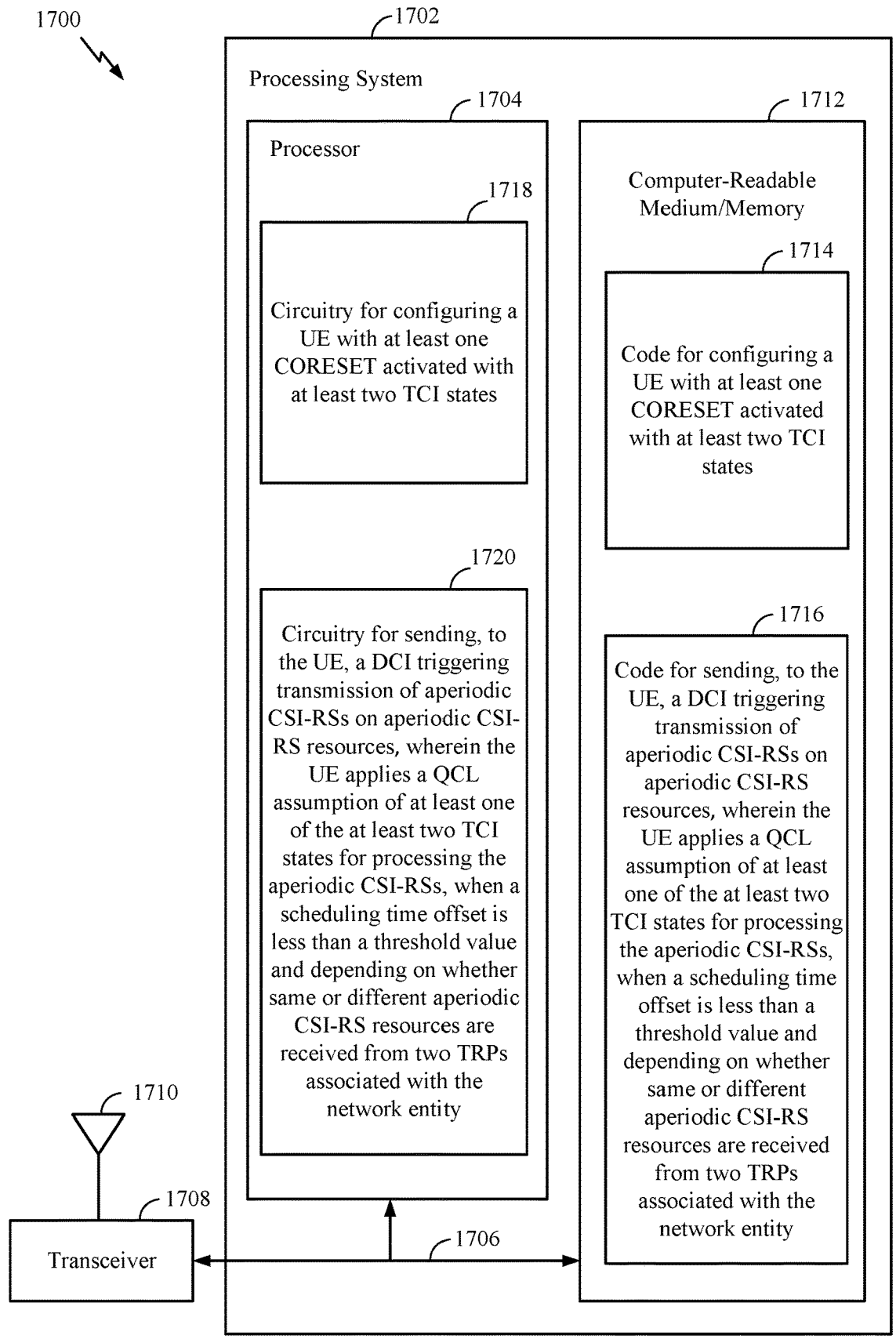

FIG. 17 illustrates a communications device 1700 that may include various components (e.g., corresponding to means-plus-function components) configured to perform operations for the techniques disclosed herein, such as the operations illustrated in FIG. 11. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 is configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., a computer-executable code) that when executed by the processor 704, cause the processor 1704 to perform the operations illustrated in FIG. 11, or other operations for performing the various techniques discussed herein. In certain aspects, computer-readable medium/memory 1712 stores code 1714 for configuring and code 1716 for sending. The code 1716 for configuring may include code for configuring a UE with at least one CORESET activated with at least two TCI states. The code 1716 for sending may include code for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value and depending on whether same or different aperiodic CSI-RS resources are received from two TRPs associated with the network entity.

The processor 1704 may include circuitry configured to implement the code stored in the computer-readable medium/memory 1712, such as for performing the operations illustrated in FIG. 11, as well as other operations for performing the various techniques discussed herein. For example, the processor 1704 includes circuitry 1718 for configuring and circuitry 1720 for sending. The circuitry 1718 for configuring may include circuitry for configuring a UE with at least one CORESET activated with at least two TCI states. The circuitry 1720 for sending may include circuitry for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value and depending on whether same or different aperiodic CSI-RS resources are received from two TRPs associated with the network entity.

Figure 18:
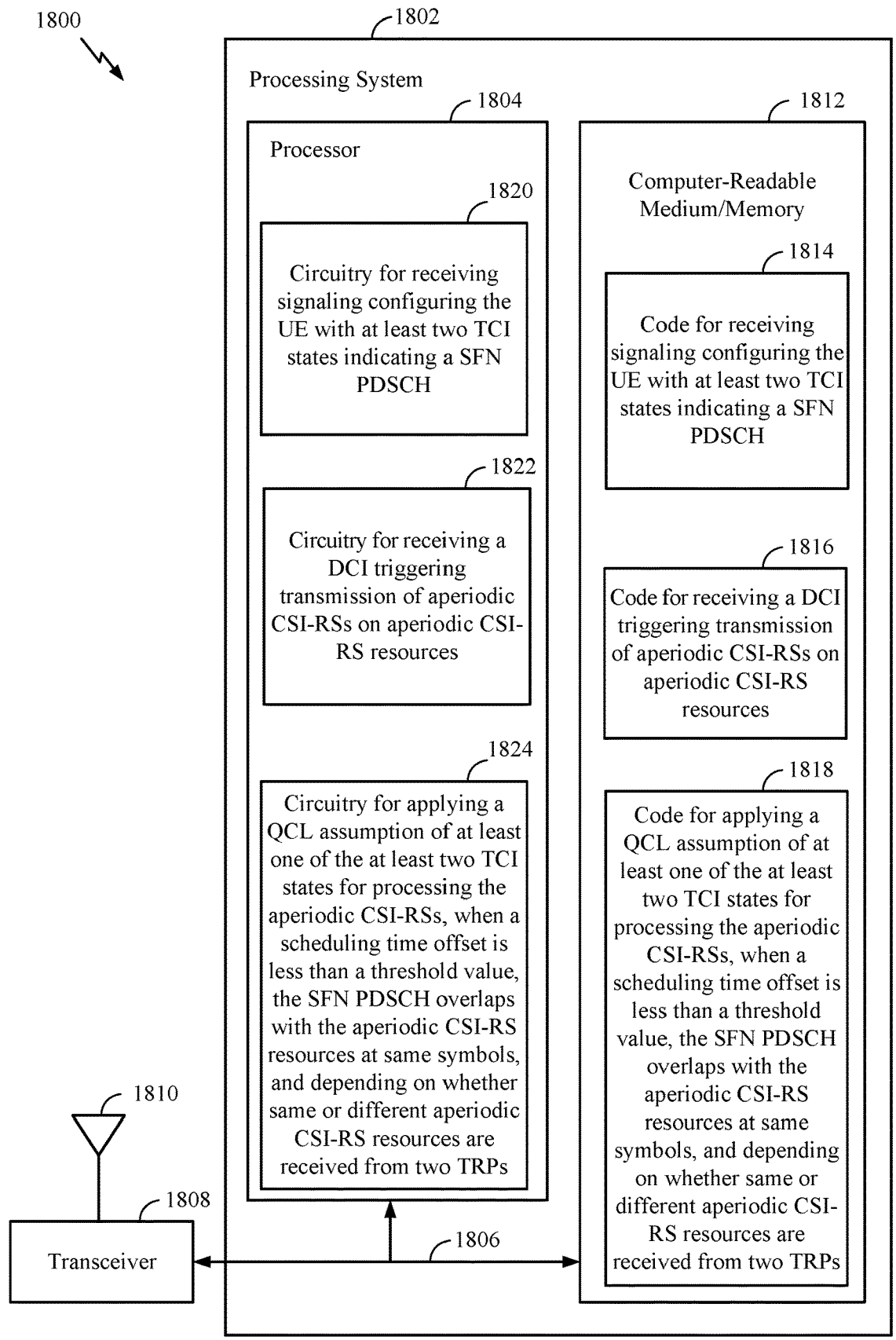

FIG. 18 illustrates a communications device 1800 that may include various components (e.g., corresponding to means-plus-function components) configured to perform operations for the techniques disclosed herein, such as the operations illustrated in FIG. 12. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 is configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., a computer-executable code) that when executed by the processor 1804, cause the processor 1804 to perform the operations illustrated in FIG. 12, or other operations for performing the various techniques discussed herein. In certain aspects, computer-readable medium/memory 1812 stores code 1814 for receiving, code 1816 for receiving, and code 1818 for applying. The code 1814 for receiving may include code for receiving signaling configuring the UE with at least two TCI states indicating a single frequency network (SFN) physical downlink shared channel (PDSCH). The code 1816 for receiving may include code for receiving a DCI triggering transmission of aperiodic CSI-RSs on aperiodic CSI-RS resources. The code 1818 for applying may include code for applying a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs.

The processor 1804 may include circuitry configured to implement the code stored in the computer-readable medium/memory 1812, such as for performing the operations illustrated in FIG. 12, as well as other operations for performing the various techniques discussed herein. For example, the processor 1804 includes circuitry 1820 for receiving, circuitry 1822 for receiving, and circuitry 1824 for applying. The circuitry 1420 for receiving may include circuitry for receiving signaling configuring the UE with at least two TCI states indicating a SFN PDSCH. The circuitry 1822 for receiving may include circuitry for receiving a DCI triggering transmission of aperiodic CSI-RSs on aperiodic CSI-RS resources. The circuitry 1824 for applying may include circuitry for applying a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two (TRPs.

Figure 19:
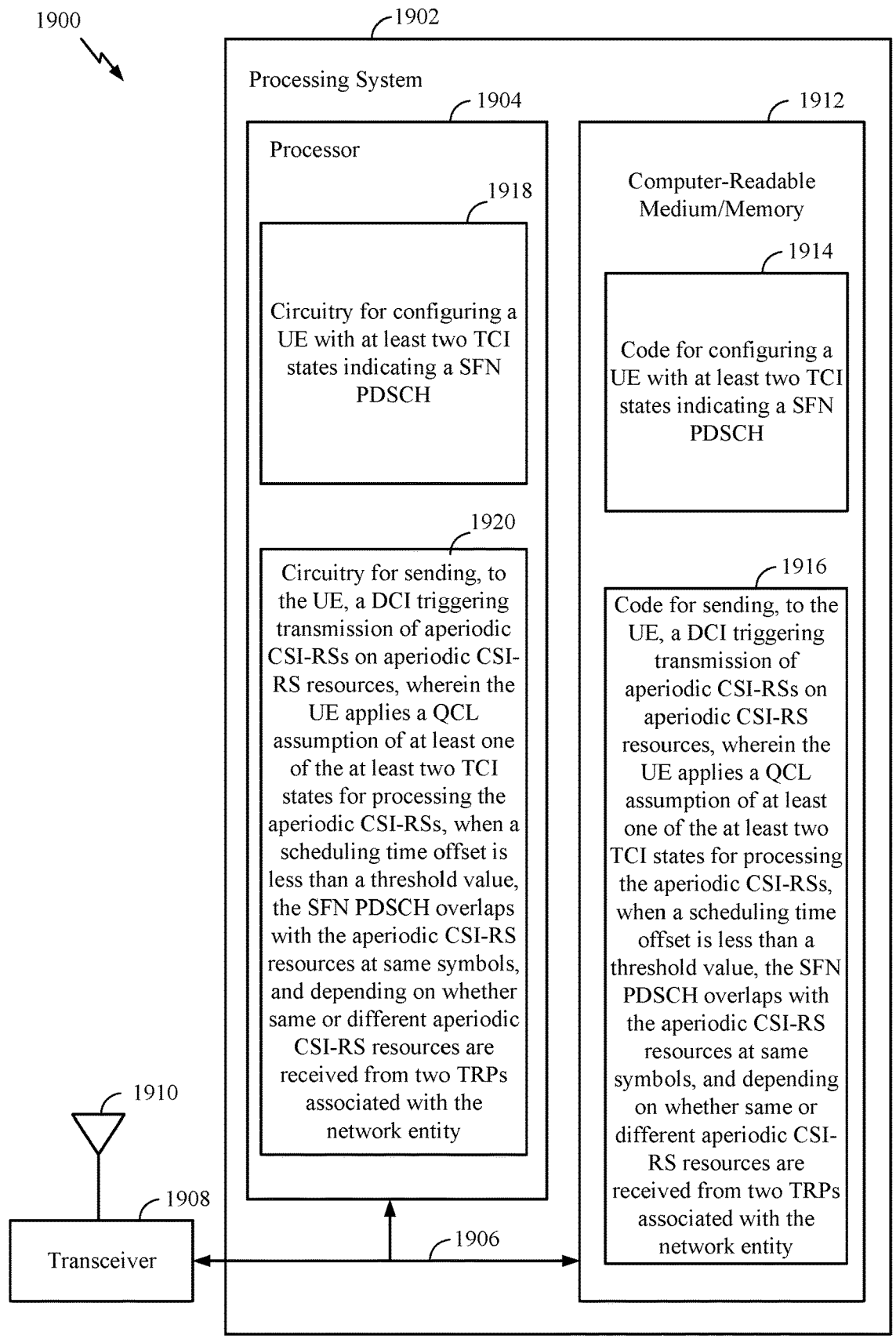

FIG. 19 illustrates a communications device 1900 that may include various components (e.g., corresponding to means-plus-function components) configured to perform operations for the techniques disclosed herein, such as the operations illustrated in FIG. 13. The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 is configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., a computer-executable code) that when executed by the processor 1904, cause the processor 1904 to perform the operations illustrated in FIG. 13, or other operations for performing the various techniques discussed herein. In certain aspects, computer-readable medium/memory 1912 stores code 1914 for configuring and code 1916 for sending. The code 1916 for configuring may include code for configuring a UE with at least two TCI states indicating a SFN PDSCH. The code 1916 for sending may include code for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs associated with the network entity.

The processor 1904 may include circuitry configured to implement the code stored in the computer-readable medium/memory 1912, such as for performing the operations illustrated in FIG. 13, as well as other operations for performing the various techniques discussed herein. For example, the processor 1904 includes circuitry 1918 for configuring and circuitry 1920 for sending. The circuitry 1918 for configuring may include circuitry for configuring a UE with at least two TCI states indicating a SFN PDSCH. The circuitry 1920 for sending may include circuitry for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two TRPs associated with the network entity.

Figure 20:
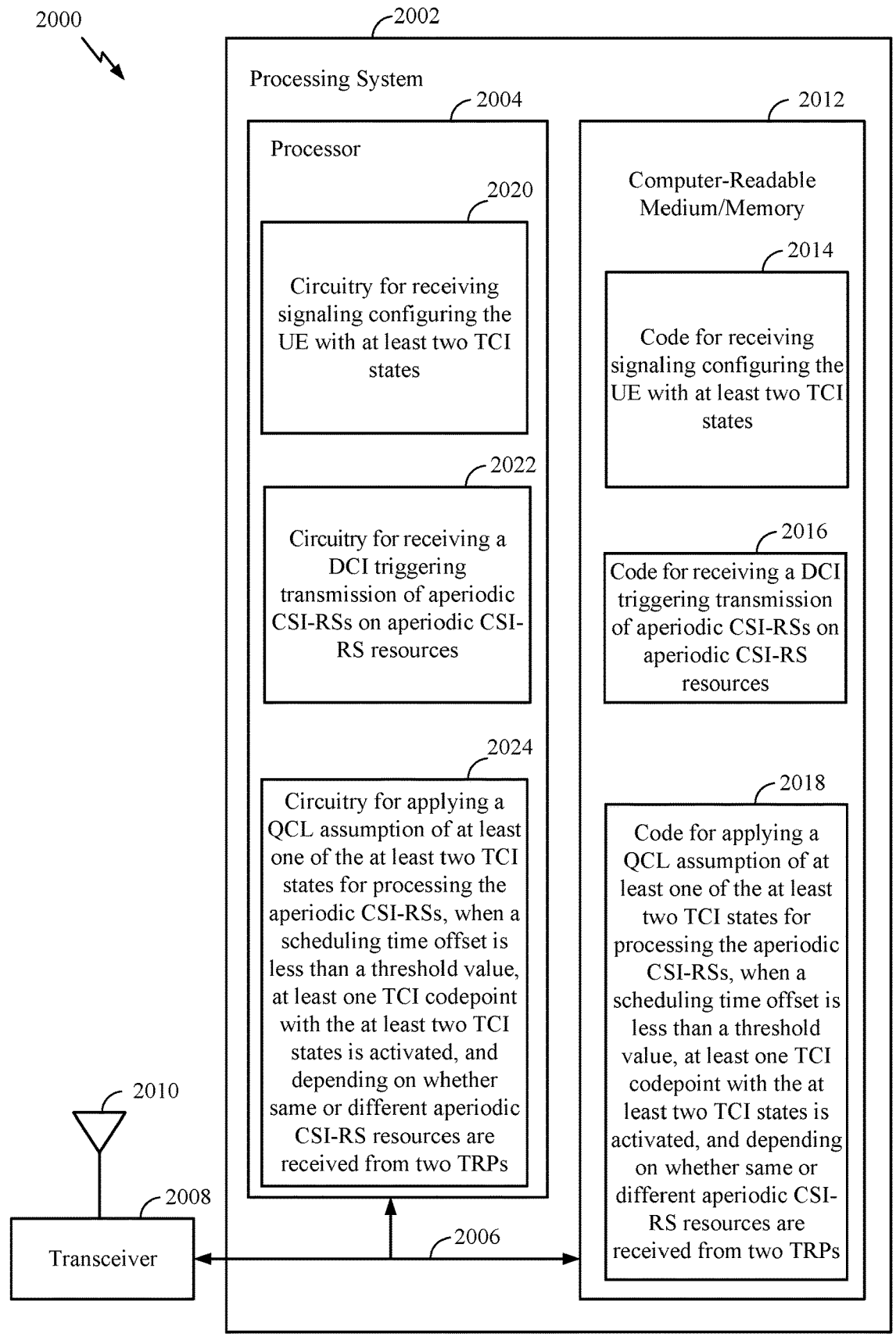

FIG. 20 illustrates a communications device 2000 that may include various components (e.g., corresponding to means-plus-function components) configured to perform operations for the techniques disclosed herein, such as the operations illustrated in FIG. 14. The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The processing system 2002 is configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/memory 2012 is configured to store instructions (e.g., a computer-executable code) that when executed by the processor 2004, cause the processor 2004 to perform the operations illustrated in FIG. 14, or other operations for performing the various techniques discussed herein. In certain aspects, computer-readable medium/memory 2012 stores code 2014 for receiving, code 2016 for receiving, and code 2018 for applying. The code 2014 for receiving may include code for receiving signaling configuring the UE with at least two TCI states. The code 2016 for receiving may include code for receiving a DCI triggering transmission of aperiodic CSI-RSs on aperiodic CSI-RS resources. The code 2018 for applying may include code for applying a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two (TRPs.

The processor 2004 may include circuitry configured to implement the code stored in the computer-readable medium/memory 2012, such as for performing the operations illustrated in FIG. 14, as well as other operations for performing the various techniques discussed herein. For example, the processor 2004 includes circuitry 2020 for receiving, circuitry 2022 for receiving, and circuitry 2024 for applying. The circuitry 2020 for receiving may include circuitry for receiving signaling configuring the UE with at least two TCI states. The circuitry 2022 for receiving may include circuitry for receiving a DCI triggering transmission of aperiodic CSI-RSs on aperiodic CSI-RS resources. The circuitry 2024 for applying may include circuitry for applying a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs.

Figure 21:
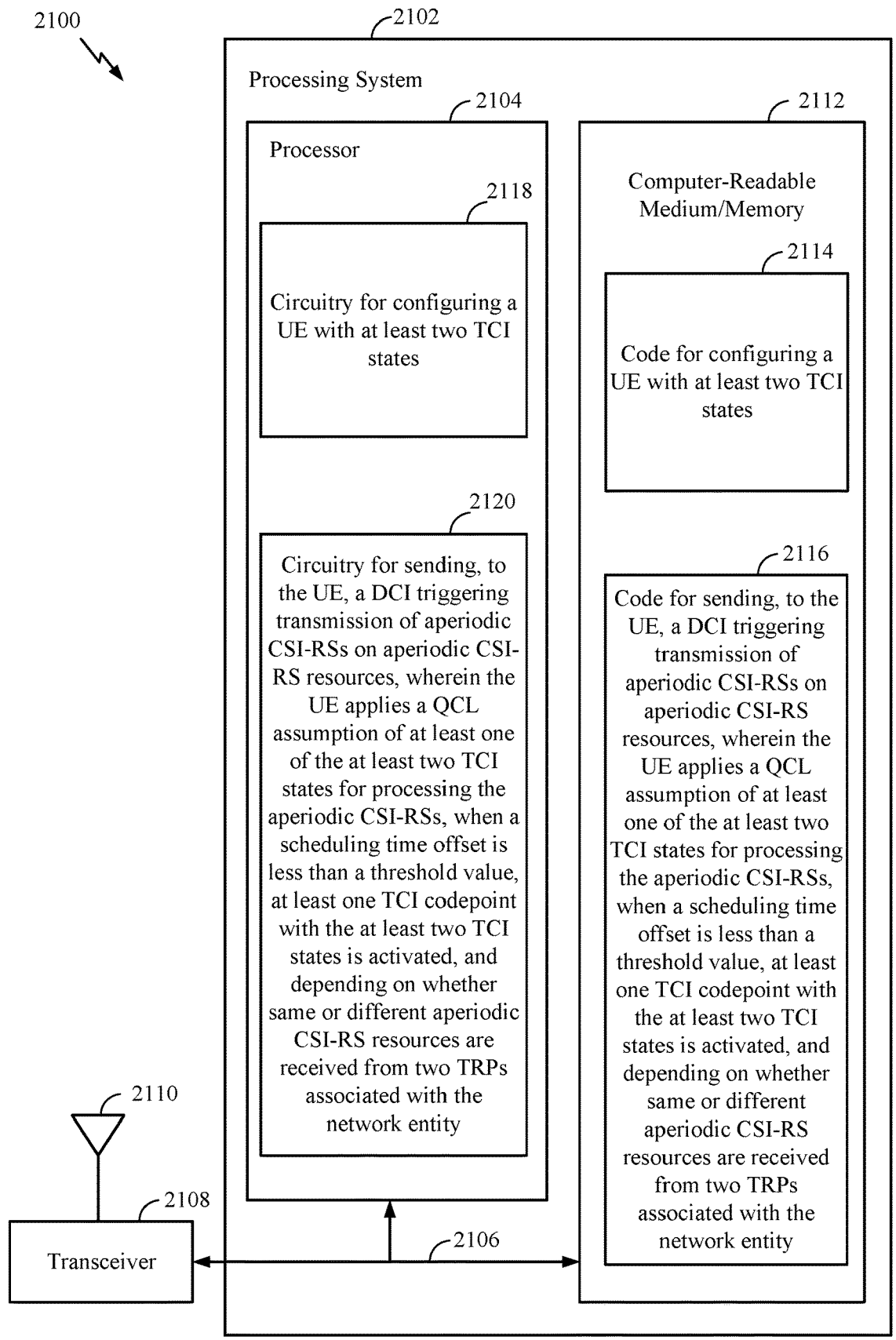

FIG. 21 illustrates a communications device 2100 that may include various components (e.g., corresponding to means-plus-function components) configured to perform operations for the techniques disclosed herein, such as the operations illustrated in FIG. 15. The communications device 2100 includes a processing system 2102 coupled to a transceiver 2108 (e.g., a transmitter and/or a receiver). The transceiver 2108 is configured to transmit and receive signals for the communications device 2100 via an antenna 2110, such as the various signals as described herein. The processing system 2102 is configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions (e.g., a computer-executable code) that when executed by the processor 2104, cause the processor 2104 to perform the operations illustrated in FIG. 15, or other operations for performing the various techniques discussed herein. In certain aspects, computer-readable medium/memory 2112 stores code 2114 for configuring and code 2116 for sending. The code 2116 for configuring may include code for configuring a UE with at least two TCI states. The code 2116 for sending may include code for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs associated with the network entity.

The processor 2104 may include circuitry configured to implement the code stored in the computer-readable medium/memory 2112, such as for performing the operations illustrated in FIG. 15, as well as other operations for performing the various techniques discussed herein. For example, the processor 2104 includes circuitry 2118 for configuring and circuitry 2120 for sending. The circuitry 2118 for configuring may include circuitry for configuring a UE with at least two TCI states. The circuitry 2120 for sending may include circuitry for sending, to the UE, a DCI triggering transmission of aperiodic CSI-RSs on aperiodic CSI-RS resources, wherein the UE applies a QCL assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two TRPs associated with the network entity.

Example Disaggregated BS

FIG. 22 depicts an example disaggregated base station (BS) 2200 architecture. The disaggregated BS 2200 architecture may include one or more central units (CUs) 2210 that can communicate directly with a core network 2220 via a backhaul link, or indirectly with the core network 2220 through one or more disaggregated BS units (such as a Near-Real Time (Near-RT) RAN Intelligent Controller (MC) 2225 via an E2 link, or a Non-Real Time (Non-RT) RIC 2215 associated with a Service Management and Orchestration (SMO) Framework 2205, or both). A CU 2210 may communicate with one or more distributed units (DUs) 2230 via respective midhaul links, such as an F1 interface. The DUs 2230 may communicate with one or more radio units (RUs) 2240 via respective fronthaul links. The RUs 2240 may communicate with respective UEs 104 via one or more radio frequency (RF) access links. In some implementations, the UE 120 may be simultaneously served by multiple RUs 2240.

Each of the units, i.e., the CUs 2210, the DUs 2230, the RUs 2240, as well as the Near-RT RICs 2225, the Non-RT RICs 2215 and the SMO Framework 2205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 2210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2210. The CU 2210 may be configured to handle user plane functionality (i.e., Central Unit-User Plane (CU-UP)), control plane functionality (i.e., Central Unit-Control Plane (CU-CP)), or a combination thereof. In some implementations, the CU 2210 can be logically split into one or more CU-UP units and one or more CU-CP units. The CU-UP unit can communicate bidirectionally with the CU-CP unit via an interface, such as the E1 interface when implemented in an O-RAN configuration. The CU 2210 can be implemented to communicate with the DU 2230, as necessary, for network control and signaling.

The DU 2230 may correspond to a logical unit that includes one or more base station functions to control the operation of one or more RUs 2240. In some aspects, the DU 2230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 2230 may further host one or more low PHY layers. Each layer (or module) can be implemented with an interface configured to communicate signals with other layers (and modules) hosted by the DU 2230, or with the control functions hosted by the CU 2210.

Lower-layer functionality can be implemented by one or more RUs 2240. In some deployments, an RU 2240, controlled by a DU 2230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2240 can be implemented to handle over the air (OTA) communication with one or more UEs 120. In some implementations, real-time and non-real-time aspects of control and user plane communication with the RU(s) 2240 can be controlled by the corresponding DU 2230. In some scenarios, this configuration can enable the DU(s) 2230 and the CU 2210 to be implemented in a cloud-based RAN architecture, such as a vRAN architecture.

The SMO Framework 2205 may be configured to support RAN deployment and provisioning of non-virtualized and virtualized network elements. For non-virtualized network elements, the SMO Framework 2205 may be configured to support the deployment of dedicated physical resources for RAN coverage requirements which may be managed via an operations and maintenance interface (such as an O1 interface). For virtualized network elements, the SMO Framework 2205 may be configured to interact with a cloud computing platform (such as an open cloud (O-Cloud) 2290) to perform network element life cycle management (such as to instantiate virtualized network elements) via a cloud computing platform interface (such as an O2 interface). Such virtualized network elements can include, but are not limited to, CUs 2210, DUs 2230, RUs 2240 and Near-RT RICs 2225. In some implementations, the SMO Framework 2205 can communicate with a hardware aspect of a 4G RAN, such as an open eNB (O-eNB) 2211, via an O1 interface. Additionally, in some implementations, the SMO Framework 2205 can communicate directly with one or more RUs 2240 via an O1 interface. The SMO Framework 2205 also may include a Non-RT RIC 2215 configured to support functionality of the SMO Framework 2205.

The Non-RT RIC 2215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC X25. The Non-RT RIC 2215 may be coupled to or communicate with (such as via an A1 interface) the Near-RT RIC 2225. The Near-RT RIC 1525 may be configured to include a logical function that enables near-real-time control and optimization of RAN elements and resources via data collection and actions over an interface (such as via an E2 interface) connecting one or more CUs 2210, one or more DUs 2230, or both, as well as an O-eNB, with the Near-RT RIC 2225.

In some implementations, to generate AI/ML models to be deployed in the Near-RT RIC 2225, the Non-RT RIC 2215 may receive parameters or external enrichment information from external servers. Such information may be utilized by the Near-RT RIC 2225 and may be received at the SMO Framework 2205 or the Non-RT MC 2215 from non-network data sources or from network functions. In some examples, the Non-RT MC 2215 or the Near-RT MC 2225 may be configured to tune RAN behavior or performance. For example, the Non-RT MC 2215 may monitor long-term trends and patterns for performance and employ AI/ML models to perform corrective actions through the SMO Framework 2205 (such as reconfiguration via O1) or via creation of RAN management policies (such as A1 policies).

Example Aspects

Implementation examples are described in the following numbered aspects.

In a first aspect, a method for wireless communications by a user equipment (UE), comprising: receiving signaling configuring the UE with at least one control resource set (CORESET) activated with at least two transmission configuration indicator (TCI) states; receiving a downlink control information (DCI) triggering transmission of aperiodic channel state information (CSI) reference signals (RSs) on aperiodic CSI-RS resources; and applying a quasi-colocation (QCL) assumption of at least one of the at least two TCI states for processing the aperiodic CSI-RSs, when a scheduling time offset is less than a threshold value and depending on whether same or different aperiodic CSI-RS resources are received from two transmission reception points (TRPs).

In a second aspect, alone or in combination with the first aspect, the scheduling time offset comprises a time offset between the DCI and the aperiodic CSI-RS resources.

In a third aspect, alone or in combination with one or more of the first and second aspects, the UE applies one or more QCL assumptions of one of the at least two TCI states of the at least one CORESET for processing the aperiodic CSI-RSs, when each aperiodic CSI-RS resource is for one TRP and associated with a single TCI state of the at least two TCI states, and a single beam receives the aperiodic CSI-RS resources.

In a fourth aspect, alone or in combination with one or more of the first through third aspects, the one of the at least two TCI states comprises a first TCI state or a second TCI state of the at least two TCI states.

In a fifth aspect, alone or in combination with one or more of the first through fourth aspects, the one of the at least two TCI states comprises a TCI state of the at least two TCI states with a lowest TCI state identity document (ID).

In a sixth aspect, alone or in combination with one or more of the first through fifth aspects, the one of the at least two TCI states comprises a TCI state of the at least two TCI states with a highest TCI state identity document (ID).

In a seventh aspect, alone or in combination with one or more of the first through sixth aspects, the one of the at least two TCI states is identical to a TCI state for the aperiodic CSI-RSs in a CSI triggering state.

In an eighth aspect, alone or in combination with one or more of the first through seventh aspects, the one of the at least two TCI states comprises a TCI state of an anchor TRP, when a Doppler shift pre-compensation is enabled for a reception of a physical downlink control channel (PDCCH) carrying a downlink (DL) DCI, and wherein the TCI state of the anchor TRP have a QCL-Type A or a QCL-Type B.

In a ninth aspect, alone or in combination with one or more of the first through eighth aspects, the one of the at least two TCI states comprises a TCI state having a QCL-Type E that does not include QCL information of a Doppler shift and a Doppler spread, when a Doppler shift pre-compensation is enabled for a reception of a physical downlink control channel (PDCCH) carrying a downlink (DL) DCI.

In a tenth aspect, alone or in combination with one or more of the first through ninth aspects, the UE applies one or more QCL assumptions of the at least two TCI states for processing the aperiodic CSI-RSs, when a same aperiodic CSI-RS resource is received from the two TRPs and associated with the at least two TCI states, and at least dual beams receive the aperiodic CSI-RS resources.

In an eleventh aspect, alone or in combination with one or more of the first through tenth aspects, each TCI state is associated with a QCL-TypeD for receiving the aperiodic CSI-RSs.

In a twelfth aspect, a method for wireless communications by a user equipment (UE), comprising: receiving signaling configuring the UE with at least two transmission configuration indicator (TCI) states indicating a single frequency network (SFN) physical downlink shared channel (PDSCH); receiving a downlink control information (DCI) triggering transmission of aperiodic channel state information (CSI) reference signals (RSs) on aperiodic CSI-RS resources; and applying a quasi-colocation (QCL) assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two transmission reception points (TRPs).

In a thirteenth aspect, alone or in combination with the twelfth aspect, the scheduling time offset comprises a time offset between the DCI and the aperiodic CSI-RS resources.

In a fourteenth aspect, alone or in combination with one or more of the twelfth and thirteenth aspects, the UE applies one or more QCL assumptions of one of the at least two TCI states for processing the aperiodic CSI-RSs, when each aperiodic CSI-RS resource is for one TRP and associated with a single TCI state of the at least two TCI states, and a single beam receives the aperiodic CSI-RS resources.

In a fifteenth aspect, alone or in combination with one or more of the twelfth through fourteenth aspects, the one of the at least two TCI states comprises a TCI state mapped to an anchor TRP, when TRP pre-compensation is enabled.

In a sixteenth aspect, alone or in combination with one or more of the twelfth through fifteenth aspects, the one of the at least two TCI states comprises a first TCI state of the at least two TCI states with a lowest TCI state identity document (ID).

In a seventeenth aspect, alone or in combination with one or more of the twelfth through sixteenth aspects, the one of the at least two TCI states is identical to a TCI state for the aperiodic CSI-RSs.

In an eighteenth aspect, alone or in combination with one or more of the twelfth through seventeenth aspects, the UE applies one or more QCL assumptions of the at least two TCI states for processing the aperiodic CSI-RSs, when a same aperiodic CSI-RS resource is received from the two TRPs and associated with the at least two TCI states, and at least dual beams receive the aperiodic CSI-RS resources.

In a nineteenth aspect, alone or in combination with one or more of the twelfth through eighteenth aspects, each TCI state is associated with a QCL-TypeD for receiving the aperiodic CSI-RSs.

In a twentieth aspect, a method for wireless communications by a user equipment (UE), comprising: receiving signaling configuring the UE with at least two transmission configuration indicator (TCI) states; receiving a downlink control information (DCI) triggering transmission of aperiodic channel state information (CSI) reference signals (RSs) on aperiodic CSI-RS resources; and applying a quasi-colocation (QCL) assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two transmission reception points (TRPs).

In a twenty-first aspect, alone or in combination with the twentieth aspect, the scheduling time offset comprises a time offset between the DCI and the aperiodic CSI-RS resources.

In a twenty-second aspect, alone or in combination with one or more of the twentieth and twenty-first aspects, a medium access control (MAC)-control element (CE) activates the at least one TCI code point with the at least two TCI states.

In a twenty-third aspect, alone or in combination with one or more of the twentieth through twenty-second aspects, the UE applies one or more QCL assumptions of one of the at least two TCI states for processing the aperiodic CSI-RSs, when each aperiodic CSI-RS resource is for one TRP and associated with a single TCI state of the at least two TCI states, and a single beam receives the aperiodic CSI-RS resources.

In a twenty-fourth aspect, alone or in combination with one or more of the twentieth through twenty-third aspects, the one of the at least two TCI states comprises a first TCI state of the at least two TCI states corresponding to a lowest TCI codepoint.

In a twenty-fifth aspect, alone or in combination with one or more of the twentieth through twenty-fourth aspects, the one of the at least two TCI states comprises a TCI state of an anchor TRP, when a TRP pre-compensation is enabled, and wherein the TCI state of the anchor TRP have a QCL-Type A or a QCL-Type B.

In a twenty-sixth aspect, alone or in combination with one or more of the twentieth through twenty-fifth aspects, the one of the at least two TCI states comprises a TCI state having a QCL-Type E that does not include QCL information of a Doppler shift and a Doppler spread, when a TRP pre-compensation is enabled.

In a twenty-seventh aspect, alone or in combination with one or more of the twentieth through a twenty-sixth aspects, the UE applies one or more QCL assumptions of the at least two TCI states for processing the aperiodic CSI-RSs, when a same aperiodic CSI-RS resource is received from the two TRPs and associated with the at least two TCI states, and at least dual beams receive the aperiodic CSI-RS resources.

In a twenty-eighth aspect, alone or in combination with one or more of the twentieth through twenty-seventh aspects, the at least two TCI states have lowest TCI codepoints.

In a twenty-ninth aspect, alone or in combination with one or more of the twentieth through twenty-eighth aspects, the at least two TCI states have highest TCI codepoints.

In a thirtieth aspect, alone or in combination with one or more of the twentieth through twenty-ninth aspects, the at least two TCI states have lowest TCI state identity documents (IDs).

In a thirty-first aspect, alone or in combination with one or more of the twentieth through thirtieth aspects, the at least two TCI states have highest TCI state identity documents (IDs).

In a thirty-second aspect, alone or in combination with one or more of the twentieth through thirty-first aspects, the at least two TCI states corresponding to lowest or highest TCI code points have different QCL assumptions.

In a thirty-third aspect, alone or in combination with one or more of the twentieth through thirty-second aspects, the at least two TCI states corresponding to lowest or highest TCI state identity documents (IDs) have different QCL assumptions.

In a thirty-fourth aspect, a method for wireless communications by a network entity, comprising: configuring a user equipment (UE) with at least one control resource set (CORESET) activated with at least two transmission configuration indicator (TCI) states; and sending, to the UE, a downlink control information (DCI) triggering transmission of aperiodic channel state information (CSI) reference signals (RSs) on aperiodic CSI-RS resources, wherein the UE applies a quasi-colocation (QCL) assumption of at least one of the at least two TCI states for processing the aperiodic CSI-RSs, when a scheduling time offset is less than a threshold value and depending on whether same or different aperiodic CSI-RS resources are received from two transmission reception points (TRPs) associated with the network entity.

In a thirty-fifth aspect, a method for wireless communications by a network entity, comprising: configuring a user equipment (UE) with at least two transmission configuration indicator (TCI) states indicating a single frequency network (SFN) physical downlink shared channel (PDSCH); and sending, to the UE, a downlink control information (DCI) triggering transmission of aperiodic channel state information (CSI) reference signals (RSs) on aperiodic CSI-RS resources, wherein the UE applies a quasi-colocation (QCL) assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two transmission reception points (TRPs) associated with the network entity.

In a thirty-sixth aspect, a method for wireless communications by a network entity, comprising: configuring a user equipment (UE) with at least two transmission configuration indicator (TCI) states; and sending, to the UE, a downlink control information (DCI) triggering transmission of aperiodic channel state information (CSI) reference signals (RSs) on aperiodic CSI-RS resources, wherein the UE applies a quasi-colocation (QCL) assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two transmission reception points (TRPs) associated with the network entity.

An apparatus for wireless communication, comprising at least one processor; and a memory coupled to the at least one processor, the memory comprising code executable by the at least one processor to cause the apparatus to perform the method of any of the first through thirty-sixth aspects.

An apparatus comprising means for performing the method of any of the first through thirty-sixth aspects.

A computer readable medium storing computer executable code thereon for wireless communications that, when executed by at least one processor, cause an apparatus to perform the method of any of the first through thirty-sixth aspects.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10-15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications by a user equipment (UE), comprising:
a memory comprising instructions; and
one or more processors configured to execute the instructions and cause the apparatus to:
receive signaling configuring the UE with at least one control resource set (CORESET) activated with at least two transmission configuration indicator (TCI) states;
receive a downlink control information (DCI) triggering transmission of aperiodic channel state information (CSI) reference signals (RSs) on aperiodic CSI-RS resources; and
apply a quasi-colocation (QCL) assumption of at least one of the at least two TCI states for processing the aperiodic CSI-RSs, when a scheduling time offset is less than a threshold value and depending on whether same or different aperiodic CSI-RS resources are received from two transmission reception points (TRPs).

2. The apparatus of claim 1, wherein the scheduling time offset comprises a time offset between the DCI and the aperiodic CSI-RS resources.

3. The apparatus of claim 1, wherein the one or more processors are further configured to execute the instructions and cause the apparatus to:
apply one or more QCL assumptions of one of the at least two TCI states of the at least one CORESET for processing the aperiodic CSI-RSs, when each aperiodic CSI-RS resource is for one TRP and associated with a single TCI state of the at least two TCI states, and a single beam receives the aperiodic CSI-RS resources.

4. The apparatus of claim 3, wherein the one of the at least two TCI states comprises a first TCI state or a second TCI state of the at least two TCI states.

5. The apparatus of claim 3, wherein the one of the at least two TCI states comprises a TCI state of the at least two TCI states with a lowest TCI state identity document (ID) or a highest TCI state ID.

6. The apparatus of claim 3, wherein the one of the at least two TCI states is identical to a TCI state for the aperiodic CSI-RSs in a CSI triggering state, and wherein the one of the at least two TCI states comprises:
a TCI state of an anchor TRP, when a Doppler shift pre-compensation is enabled for a reception of a physical downlink control channel (PDCCH) carrying a downlink (DL) DCI, and wherein the TCI state of the anchor TRP have a QCL-Type A or a QCL-Type B; and
a TCI state having a QCL-Type E that does not include QCL information of a Doppler shift and a Doppler spread, when the Doppler shift pre-compensation is enabled for the reception of the PDCCH carrying the DL DCI.

7. The apparatus of claim 1, wherein the one or more processors are further configured to execute the instructions and cause the apparatus to:
apply one or more QCL assumptions of the at least two TCI states for processing the aperiodic CSI-RSs, when a same aperiodic CSI-RS resource is received from the two TRPs and associated with the at least two TCI states, and at least dual beams receive the aperiodic CSI-RS resources.

8. The apparatus of claim 1, wherein each TCI state is associated with a QCL-TypeD for receiving the aperiodic CSI-RSs.

9. The apparatus of claim 1, wherein the at least one CORESET corresponds to a CORESET associated with a monitored search space with a lowest CORESET ID in a latest slot.

10. The apparatus of claim 1, wherein the UE is not configured with a parameter enabling two default TCI states.

11. An apparatus for wireless communications by a user equipment (UE), comprising:
a memory comprising instructions; and
one or more processors configured to execute the instructions and cause the apparatus to:
receive signaling configuring the UE with at least two transmission configuration indicator (TCI) states indicating a single frequency network (SFN) physical downlink shared channel (PDSCH);
receive a downlink control information (DCI) triggering transmission of aperiodic channel state information (CSI) reference signals (RSs) on aperiodic CSI-RS resources; and
apply a quasi-colocation (QCL) assumption of at least one of the at least two TCI states for processing the aperiodic CSI-RSs, when a scheduling time offset is less than a threshold value, the SFN PDSCH overlaps with the aperiodic CSI-RS resources at same symbols, and depending on whether same or different aperiodic CSI-RS resources are received from two transmission reception points (TRPs).

12. The apparatus of claim 11, wherein the scheduling time offset comprises a time offset between the DCI and the aperiodic CSI-RS resources.

13. The apparatus of claim 11, wherein the one or more processors are further configured to execute the instructions and cause the apparatus to:
apply one or more QCL assumptions of one of the at least two TCI states for processing the aperiodic CSI-RSs, when each aperiodic CSI-RS resource is for one TRP and associated with a single TCI state of the at least two TCI states, and a single beam receives the aperiodic CSI-RS resources.

14. The apparatus of claim 13, wherein the one of the at least two TCI states comprises a TCI state mapped to an anchor TRP, when TRP pre-compensation is enabled.

15. The apparatus of claim 13, wherein the one of the at least two TCI states comprises a first TCI state of the at least two TCI states with a lowest TCI state identity document (ID).

16. The apparatus of claim 13, wherein the one of the at least two TCI states is identical to a TCI state for the aperiodic CSI-RSs.

17. The apparatus of claim 11, wherein the one or more processors are further configured to execute the instructions and cause the apparatus to:
apply one or more QCL assumptions of the at least two TCI states for processing the aperiodic CSI-RSs, when a same aperiodic CSI-RS resource is received from the two TRPs and associated with the at least two TCI states, and at least dual beams receive the aperiodic CSI-RS resources.

18. The apparatus of claim 11, wherein each TCI state is associated with a QCL-TypeD for receiving the aperiodic CSI-RSs.

19. An apparatus for wireless communications by a user equipment (UE), comprising:
a memory comprising instructions; and
one or more processors configured to execute the instructions and cause the apparatus to:
receive signaling configuring the UE with at least two transmission configuration indicator (TCI) states;
receive a downlink control information (DCI) triggering transmission of aperiodic channel state information (CSI) reference signals (RSs) on aperiodic CSI-RS resources; and
apply a quasi-colocation (QCL) assumption of at least one of the at least two TCI states for processing the aperiodic CSI-RSs, when a scheduling time offset is less than a threshold value, at least one TCI codepoint with the at least two TCI states is activated, and depending on whether same or different aperiodic CSI-RS resources are received from two transmission reception points (TRPs).

20. The apparatus of claim 19, wherein:
the scheduling time offset comprises a time offset between the DCI and the aperiodic CSI-RS resources; and
a medium access control (MAC)-control element (CE) activates the at least one TCI code point with the at least two TCI states.

21. The apparatus of claim 19, wherein the one or more processors are further configured to execute the instructions and cause the apparatus to:
apply one or more QCL assumptions of one of the at least two TCI states for processing the aperiodic CSI-RSs, when each aperiodic CSI-RS resource is for one TRP and associated with a single TCI state of the at least two TCI states, and a single beam receives the aperiodic CSI-RS resources.

22. The apparatus of claim 21, wherein the one of the at least two TCI states comprises a first TCI state of the at least two TCI states corresponding to a lowest TCI codepoint.

23. The apparatus of claim 21, wherein the one of the at least two TCI states comprises a TCI state of an anchor TRP, when a TRP pre-compensation is enabled, and wherein the TCI state of the anchor TRP have a QCL-Type A or a QCL-Type B.

24. The apparatus of claim 21, wherein the one of the at least two TCI states comprises a TCI state having a QCL-Type E that does not include QCL information of a Doppler shift and a Doppler spread, when a TRP pre-compensation is enabled.

25. The apparatus of claim 19, wherein the UE applies one or more QCL assumptions of the at least two TCI states for processing the aperiodic CSI-RSs, when a same aperiodic CSI-RS resource is received from the two TRPs and associated with the at least two TCI states, and at least dual beams receive the aperiodic CSI-RS resources.

26. The apparatus of claim 25, wherein the at least two TCI states have:
lowest TCI codepoints;
highest TCI codepoints;
lowest TCI state identity documents (IDs); or
highest TCI state identity IDs.

27. The apparatus of claim 25, wherein:
the at least two TCI states corresponding to lowest or highest TCI code points have different QCL assumptions; and
the at least two TCI states corresponding to lowest or highest TCI state identity documents (IDs) have different QCL assumptions.

28. A method for wireless communications by a user equipment (UE), comprising:
receiving signaling configuring the UE with at least one control resource set (CORESET) activated with at least two transmission configuration indicator (TCI) states;

receiving a downlink control information (DCI) triggering transmission of aperiodic channel state information (CSI) reference signals (RSs) on aperiodic CSI-RS resources; and applying a quasi-colocation (QCL) assumption of at least one of the at least two TCI states for processing the aperiodic CSI-RSs, when a scheduling time offset is less than a threshold value and depending on whether same or different aperiodic CSI-RS resources are received from two transmission reception points (TRPs).

29. The method of claim 28, wherein;

the UE applies one or more QCL assumptions of one of the at least two TCI states of the at least one CORESET for processing the aperiodic CSI-RSs, when each aperiodic CSI-RS resource is for one TRP and associated with a single TCI state of the at least two TCI states, and a single beam receives the aperiodic CSI-RS resources; and the one of the at least two TCI states comprises a first TCI state or a second TCI state of the at least two TCI states.

30. The method of claim 28, wherein the UE applies one or more QCL assumptions of the at least two TCI states for processing the aperiodic CSI-RSs, when a same aperiodic CSI-RS resource is received from the two TRPs and associated with the at least two TCI states, and at least dual beams receive the aperiodic CSI-RS resources.

* * * * *